(12) United States Patent
Maegawa

(10) Patent No.: US 8,284,320 B2
(45) Date of Patent: Oct. 9, 2012

(54) PROGRAM DELIVERY APPARATUS AND OPERATION BUTTON FUNCTION ASSIGNING METHOD

(75) Inventor: Hideki Maegawa, Kanagawa (JP)

(73) Assignee: Sony Corporation (JP)

( * ) Notice: Subject to any disclaimer, the term of this patent is extended or adjusted under 35 U.S.C. 154(b) by 430 days.

(21) Appl. No.: 12/587,886

(22) Filed: Oct. 14, 2009

(65) Prior Publication Data

US 2010/0103324 A1   Apr. 29, 2010

(30) Foreign Application Priority Data

Oct. 27, 2008   (JP) .............................. P2008-276150

(51) Int. Cl.
*H04N 5/268* (2006.01)

(52) U.S. Cl. .......................... 348/705; 348/552; 348/734

(58) Field of Classification Search .................. 348/734, 348/705–706, 731, 460, 162, 164, 552–554; 340/825.69, 825.72, 825.22, 825.24; 715/717–718, 715/714, 716, 719; *H04N 5/268*
See application file for complete search history.

(56) References Cited

U.S. PATENT DOCUMENTS

| 7,053,811 | B2 * | 5/2006 | Aratani et al. | 341/173 |
| 7,714,940 | B2 * | 5/2010 | Lefevre et al. | 348/734 |
| 7,826,792 | B2 * | 11/2010 | Morita et al. | 455/3.06 |

FOREIGN PATENT DOCUMENTS

| JP | 62-140125 A | 6/1987 |
| JP | 2008-048189 A | 2/2008 |

* cited by examiner

*Primary Examiner* — Trang U Tran
(74) *Attorney, Agent, or Firm* — Lerner, David, Littenberg, Krumholz & Mentlik, LLP

(57) ABSTRACT

A program delivery apparatus including a program delivery control section configured to control program delivery based on a program delivery program made up of a plurality of items; a switcher configured to switch video signals when connected to the program delivery control section via communication channels; a plurality of operation buttons; and a storage section configured to store function assignment information about assigning functions to the plurality of operation buttons.

8 Claims, 24 Drawing Sheets

FIG. 12

| No | Start Time | Event Title | Time Scale | Script | | | Story Name | | | |
|----|------------|-------------|------------|--------|---|---|------------|---|---|---|
| | | | | Duration | Video | Key | Audio1 | Audio2 | BGM | |
| S | 00:00:00 | | | | | START | | | | |
| 1 | 00:00:00 | 00:00 | | | | Opening | | | | |
| 2 | 00:00:00 | 00:00 | | | | | | | | |
| 1 | OTS | | | 00:00 | Mix | Today's News Top3 | SVR | | | SV |
| | | | | | Mix 0.5 SEC | News Top3 | | | | |

GIVEN ME PORTION IN PLAYLIST [EFFECTS, DURATION, ETC.]

| NO. | CONFIGURATION NAME | ME CONFIGURATION ||||||| |
|---|---|---|---|---|---|---|---|---|
| | | Bkgd A | Bkgd B | Key 1 | Key 1 Control | Key 2 | Key 2 Control | CONTENT OF TRANSITION | ASSIGNMENT DATA |
| 1 | RELAY 1 | PICTURE FROM STUDIO CAMERA 1 | PICTURE OF THE STADIUM | COMMENT IN SUBTITLES | (SETTING DATA A) | PERFORM 1 SUPERPOSED | (SETTING DATA C) (POSITION INFORMATION 1) | CUT | (ASSIGNMENT DATA 1) |
| 2 | STUDIO 1 | PICTURE OF THE STADIUM | PICTURE FROM STUDIO CAMERA 1 | COMMENT IN SUBTITLES | (SETTING DATA A) | (NONE) | (NONE) | WIPE 3 30 FRAMES | (ASSIGNMENT DATA 2) |
| 3 | RELAY 2 | PICTURE FROM STUDIO CAMERA 1 | PICTURE FROM STUDIO CAMERA 2 | CM CHARACTERS | (SETTING DATA B) | PERFORM 2 SUPERPOSED | (SETTING DATA D) (POSITION INFORMATION 1) | MIX 10 FRAMES | (ASSIGNMENT DATA 3) |
| 4 | RELAY 3 | PICTURE FROM STUDIO CAMERA 2 | PICTURE FROM STUDIO CAMERA 1 | PERFORM 1 SUPERPOSED | (SETTING DATA C) (POSITION INFORMATION 1) | (NONE) | (NONE) | CG 7 50 FRAMES | (ASSIGNMENT DATA 4) |

FIG.19

| BUTTON NO. | 1 | 2 | 3 | 4 | 5 | ... |
|---|---|---|---|---|---|---|
| ME | 1 | 1 | 1 | 1 | - | |
| BUS | A | A | A | A | - | |
| INPUT NO. | 5 | 6 | 7 | 11 | - | |
| DISPLAY CHARACTER STRING | Remote4 | Remote8 | CAM3 | CAM4 Shot2 | - | |

FIG.20

| BUTTON NO. | 1 | 2 | 3 | 4 | 5 | ... |
|---|---|---|---|---|---|---|
| ME | 1 | 2 | 2 | 3 | - | |
| BUS | A | A | B | B | - | |
| INPUT NO. | 5 | 5 | 5 | 11 | - | |
| DISPLAY CHARACTER STRING | Remote4 | Remote4 | Remote4 | CAM4 Shot2 | - | |

FIG.21

| ME | 1 |
|---|---|
| BUS | A |

| BUTTON NO. | 1 | 2 | 3 | 4 | 5 | ... |
|---|---|---|---|---|---|---|
| INPUT NO. | 5 | 6 | 7 | 11 | - | |
| DISPLAY CHARACTER STRING | Remote4 | Remote8 | CAM3 | CAM4 Shot2 | - | |

FIG.24

| ME | 1 |
|---|---|
| BUS | A |

| BUTTON NO. | 1 | 2 | 3 | 4 | 5 | ... |
|---|---|---|---|---|---|---|
| INPUT NO. | 5 | MATERIAL A | MATERIAL B | 11 | - | |
| DISPLAY CHARACTER STRING | Remote4 | Clip_A | Clip_B | CAM4 Shot2 | - | |

PROGRAM DELIVERY APPARATUS AND OPERATION BUTTON FUNCTION ASSIGNING METHOD

CROSS-REFERENCE TO RELATED APPLICATION

The present application claims priority from Japanese Patent Application No. JP 2008-276150 filed in the Japanese Patent Office on Oct. 27, 2008, the entire content of which is incorporated herein by reference.

BACKGROUND OF THE INVENTION

1. Field of the Invention

The present invention relates to a program delivery apparatus and an operation button function assigning method. More particularly, the invention relates to a program delivery apparatus and an operation button function assigning method whereby functions are suitably assigned to a plurality of operation buttons in relation to the items making up a program delivery program.

2. Description of the Related Art

There exist such program delivery apparatuses for use by broadcast stations as those (disclosed illustratively in Japanese Patent Laid-open No. 2008-48189) having a program delivery control section for controlling switcher equipment and related devices to deliver programs based on a program delivery program (known as a playlist or a cue sheet) made up of a plurality of items. In this case, bus sources (i.e., input video signals) making up the screen such as pictures in picture-in-pictures (PinP) and chromakey background pictures are set uniquely within the items constituting a program delivery program (i.e., playlist structure).

SUMMARY OF THE INVENTION

The sources such as pictures in picture-in-pictures and chromakey background pictures may not be changed manually using an OTC (one touch control) panel or from program delivery programs (playlists) while the program of interest is being put on the air. Ordinarily, these sources have to be operated directly from the switcher panel.

The embodiments of the present invention has been made in view of the above circumstances and provides a program delivery apparatus and an operation button function assigning method for suitably assigning functions to a plurality of operation buttons in relation to the items constituting a program delivery program. The invention further provides a program delivery apparatus and an operation button function assigning method for allowing such sources as pictures in picture-in-pictures and chromakey background pictures to be manually switched easily while the program is being put on the air.

In carrying out the embodiments of the present invention and according to one embodiment thereof, there is provided a program delivery apparatus including: a program delivery control section configured to control program delivery based on a program delivery program made up of a plurality of items; a switcher configured to switch video signals when connected to the program delivery control section via communication channels; a plurality of operation buttons; and a storage section configured to store function assignment information about assigning functions to the plurality of operation buttons; wherein each of the items of the program delivery program includes the function assignment information regarding the plurality of operation buttons; and wherein, in accordance with control of the switcher based on each of the items making up the program delivery program, the program delivery control section writes the function assignment information included in each of the items to the storage section, whereby the plurality of operation buttons are assigned the functions.

According to the embodiments of the present invention, the switcher of video signals is connected to the program delivery control section via communication channels. Based on a program delivery program made up of a plurality of items, the program delivery control section controls the switcher and related devices for program delivery. When function assignment information is written to the storage section, relevant functions are assigned to a plurality of operation buttons. Illustratively, the plurality of operation buttons may be controlled by an operation button control section connected to the program delivery control section and the switcher via communication channels. The storage section mentioned above may be incorporated illustratively in the operation button control section.

Each of the items of the program delivery program (i.e., playlist or cue sheet configurations) includes the function assignment information regarding the plurality of operation buttons. In accordance with control of the switcher based on each of the items making up the program delivery program, the program delivery control section writes the function assignment information included in each of the items to the storage section. This permits proper assignment of functions to the plurality of operation buttons in relation to each of the items making up the program delivery program.

According to the embodiments of the present invention, the functions assigned based on the function assignment information to the plurality of operation buttons may illustratively be functions which designate the switcher to select a bus input video signal. This makes it possible for the operator manually to switch such sources as pictures in picture-in-pictures and chromakey background pictures easily using operation buttons while the program is being put on the air.

Also according to the embodiments of the present invention, the function assignment information may illustratively include a target bus for the switcher, a display content to be displayed either on the operation buttons or on a display section corresponding to the operation buttons, and input number information about the selected input video signal. In this case, the function assignment information includes the display content to be displayed either on the operation buttons or on the display section corresponding to these operation buttons. When the functions assigned to the operation buttons are thus displayed on these operation buttons (having display capabilities) or on the display section, the ease of operation for the operator is enhanced appreciably.

Also according to the embodiments of the present invention, the function assignment information may illustratively include information about the target bus for the switcher with regard to each of the operation buttons. This makes it possible to select input video signals targeted not for one but for a plurality of buses regarding the item of interest in the program delivery program by use of a plurality of operation buttons.

Illustratively, the program delivery apparatus according to the embodiments of the present invention may further include a material server configured to have a plurality of output channels for outputting video materials and be connected to the program delivery control section via communication channels; wherein the function assignment information may include either a video signal input number for the switcher or video material information for the material server as input number information about the selected input video signal;

and wherein, when the function assignment information is to be written to the storage section in accordance with control of the switcher based on each of the items making up the program delivery program, if the input number information about the input video signal is the video material information for the material server, then the program delivery control section may substitute the video material information for the video signal input number of the switcher in relation to the output channels through which the video materials of the material server are output based on output channel information about the video materials of the material server. Illustratively, the program delivery control section is fed with output channel information about the video materials from a newsroom control system that controls the material server.

As described, the video material information of the material server is replaced by video signal input numbers of the switcher and written to the storage section. Thus when the information about the video materials of the material server is included as information about the input numbers of the input video signals to be selected, the operation buttons may be used to designate suitable selection of the bus input video signals (i.e., video materials from the material server) for the switcher.

According to the embodiments of the present invention, in accordance with control of the switcher based on each of the items making up a program delivery program, the function assignment information contained in the item of interest is written to the storage section that stores the function assignment information about a plurality of operation buttons. When functions are properly assigned as described above to a plurality of operation buttons in relation to each of the items constituting the program delivery program, the ease of operation is improved significantly.

BRIEF DESCRIPTION OF THE DRAWINGS

Further aims and advantages of the present invention will become apparent upon a reading of the following description and appended drawings in which:

FIG. 12 is a schematic view showing a playlist with SVR selected therein;

FIG. 17 is a tabular view showing a typical playlist content;

FIG. 19 is a tabular view showing typical assignment data;

FIG. 20 is a tabular view showing another typical assignment data;

FIG. 21 is a tabular view showing still another typical assignment data;

FIG. 24 is a tabular view showing typical assignment data including information about the video materials of a material server as information about the input numbers of input video signals to be selected;

DETAILED DESCRIPTION OF THE PREFERRED EMBODIMENTS

The preferred embodiments of the present invention (called the embodiment(s) hereunder) will now be described. The description will be given under the following headings:
 1. Embodiments
 2. Variations
<1. Embodiments>
[Typical Structure of the Program Delivery Control System]

Figure 1:
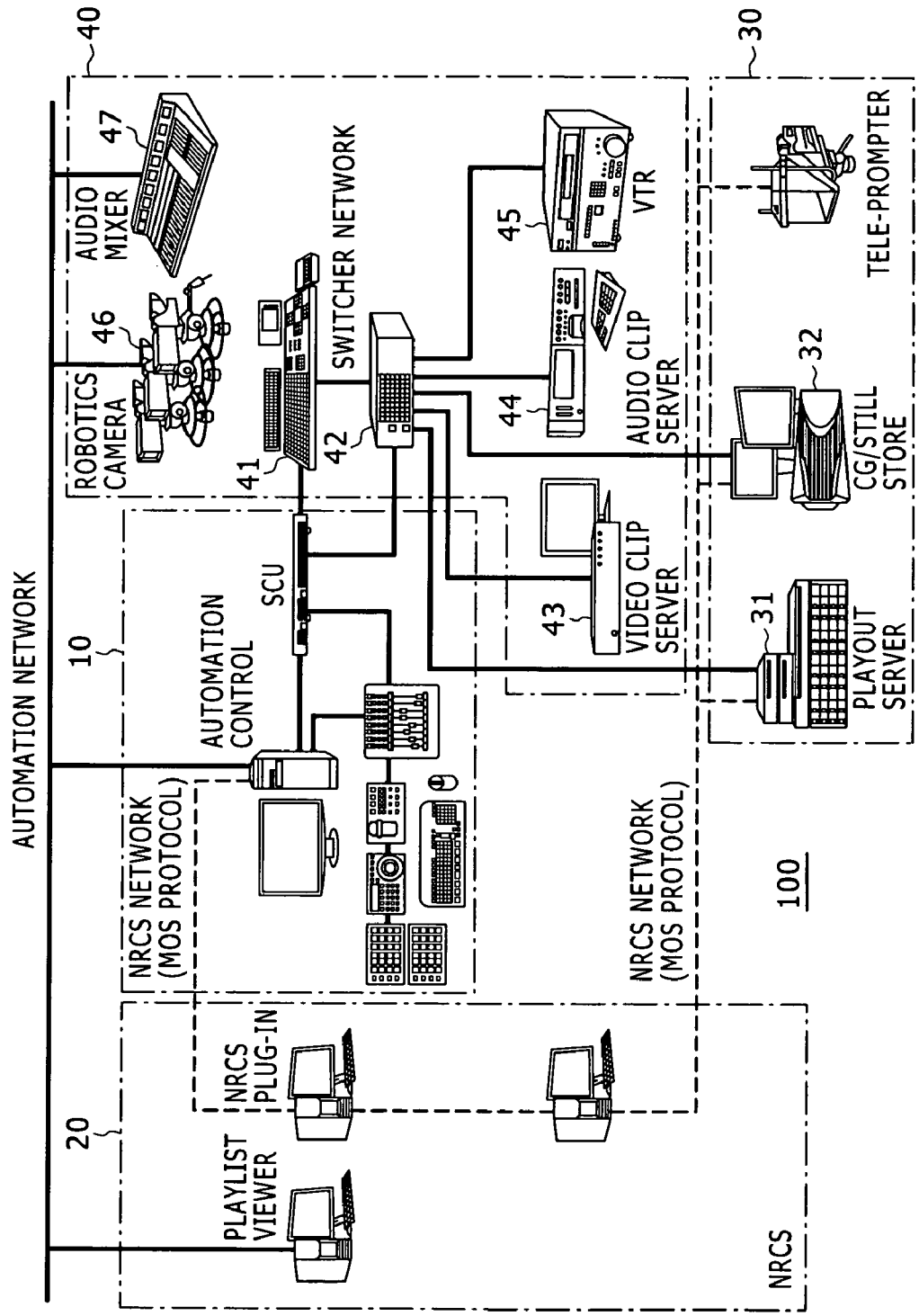
FIG. 1 is a block diagram showing a typical configuration of a program delivery control system as an embodiment of the present invention.

FIG. 1 shows a typical configuration of a program delivery control system 100 as an embodiment of the present invention. The program delivery control system 100 includes an automation control block 10, a newsroom control system (NRCS) block 20, an MOS device block 30, and an automation control device block 40.

The control block 10 controls program delivery based on a playlist (cue sheet) made up of a plurality of configurations. The playlist constitutes a program delivery program, and the configurations contained in the playlist correspond to the items making up the program delivery program. The NRCS block 20 performs administrative controls over news programs ranging from making arrangements for news gathering to placing orders for materials to preparing program configurations. The MOS (media object server) device block 30 contains a play-out server 31, a CG/still store 32, etc., connected to the NRCS block 20 on a network (MOS protocol). The control device block 40 has a switcher 41, a device control unit (DCU) 42, a video clip server 43, and an audio clip server 44 connected to the control block 10. Also, the control device block 40 includes a video tape recorder (VTR) 45, robotics cameras 46, and an audio mixer 47.

The NRCS block 20 is connected to the control block and MOS device block 30 via the NRCS network as the MOS protocol. The MOS protocol is a protocol that primarily enables the NRCS to remotely control video servers set up in the newsroom. As such, the MOS protocol is allowed to expand on its own using XML (Extensible Markup Language).

Plug-ins for automation use (NRCS plug-in) and a playlist viewer are installed in each NRCS client. To each of the MOS devices making up the MOS device block 30, the device control unit 42 of the automation control device block 40 issues on-air timing signals by taking illustratively Tally/GPI as a trigger.

In this setup, the play-out server 31 is a video server which stores materials being changed on a daily basis and which is desired to provide enhanced functionality for use in edit work. The play-out server 31 has playlists and an MOS interface. Because of the need to feed or edit materials rapidly, the play-out server 31 is often a server that provides higher performance than the video clip server 43. Depending on the server type, it may be impossible for the play-out server 31 to output different materials consecutively using the same channel. This characteristic is taken into account and suitable channel assignment control is desired accordingly.

[Typical Structure of the Software Blocks of the Program Delivery Control System]

Figure 2:
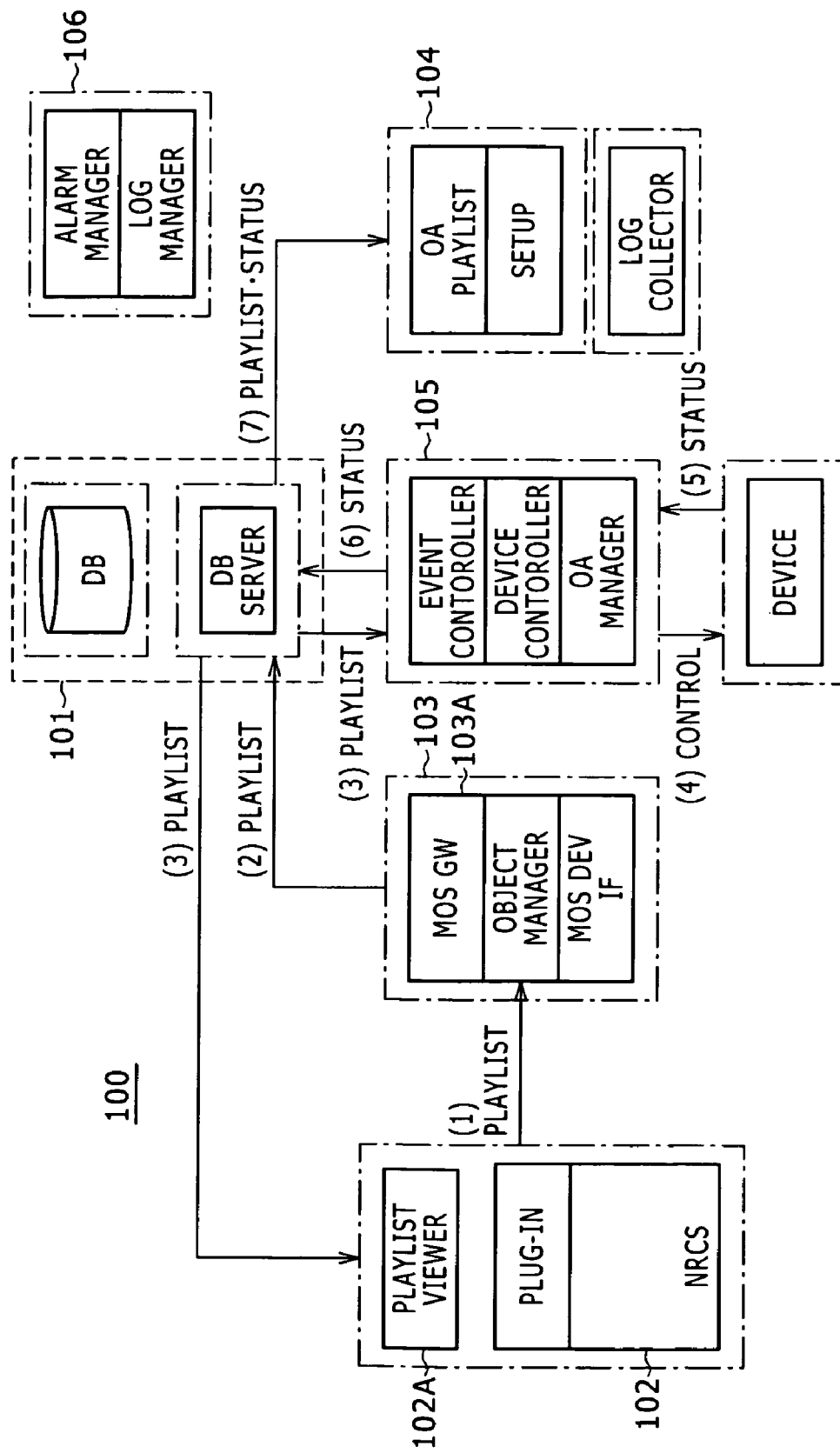
FIG. 2 is a schematic view showing a typical structure of software blocks of the program delivery control system.

FIG. 2 shows a typical structure of the software blocks of the program delivery control system 100. Specifically, the program delivery control system 100 has a database (DB) section 101, an NRCS plug-in/playlist viewer section 102, and an NRCS interface (NRCS IF) section 103. Also, the program delivery control system 100 includes an on-air (OA) playlist/setup section 104, a device controller section 105, and a log/alarm manager section 106. These elements in the program delivery control system 100 make up the automation system.

The automation system is a body of software for TDA (technical director assist). Installed in a computer under NRCS control, the automation system controls devices including the switcher. Meanwhile, servers under the automation system also have playlists each. Generally, a producer (P) configures an entire news program, and a technical director (TD) assigns and sets up the devices for the stories to be included in the news program. The automation system assists the technical director in controlling the devices involved. A playlist is a list that holds the specifics of the progress of a program in chronological order.

Under the automation system, the playlist data is created by the NRCS of the NRCS plug-in/playlist viewer section 102 (in the direction (1) in FIG. 2) and sent to the database section 101 via an MOS gateway (GW) 103A of the NRCS interface section 103 (in the direction (2)). The playlist data is stored onto the database (DB) of the database section 101.

Playlist data is displayed on a playlist viewer 102A of the NRCS plug-in/playlist viewer section 102 (in the direction (3)) and also sent to the device controller section 105 when a program comes on the air. The devices in on-the-air status are controlled according to the playlist (in the directions (4) and (5)), and notification of device status is sent to the database (DB) of the database section 101 (in the direction (6)). The playlist and device status are sent to and displayed by the on-air playlist/setup section 104 (in the direction (7)). Logs and warnings are generated inside the automation system and sent to the log/alarm manager section 106.

[Typical Implementation of the Software Blocks of the Program Delivery Control System]

Each of the above-mentioned software blocks constituting the automation system may be installed individually in a separate personal computer. This provides a scalable system that fits the scope of the customer's system.

Figure 3:
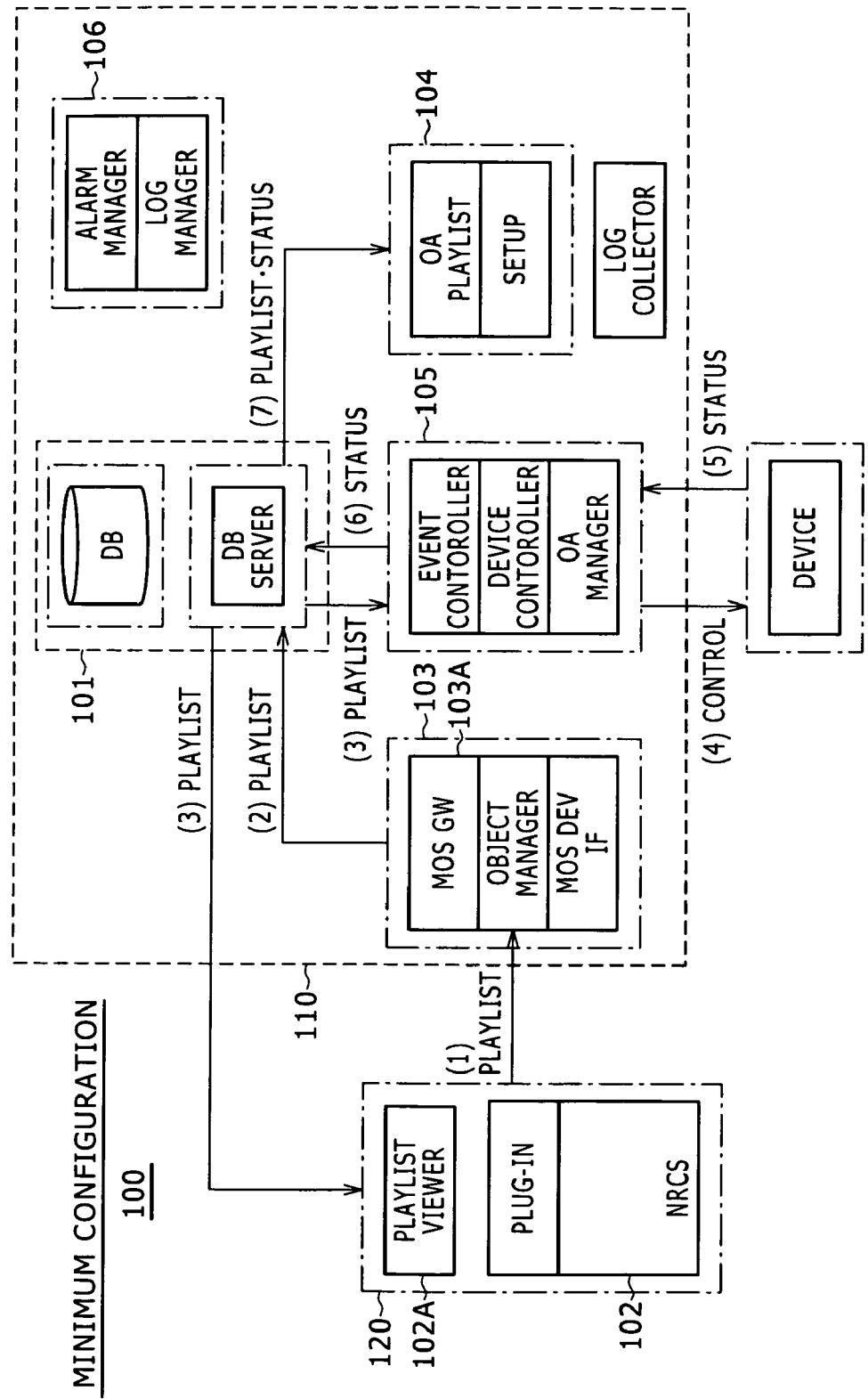
FIG. 3 is a schematic view showing a typical implementation of the software blocks of the program delivery control system.

FIG. 3 shows a typical implementation of the software blocks of the program delivery control system 100. In this implementation, the database section 101, NRCS interface section 103, on-air playlist/setup section 104, device controller section 105, and log/alarm manager section 106 are installed in a single computer 110. The NRCS plug-in/playlist viewer section 102 is installed in the customer's computer 120 in which an NRCS client has been installed.

Figure 4:
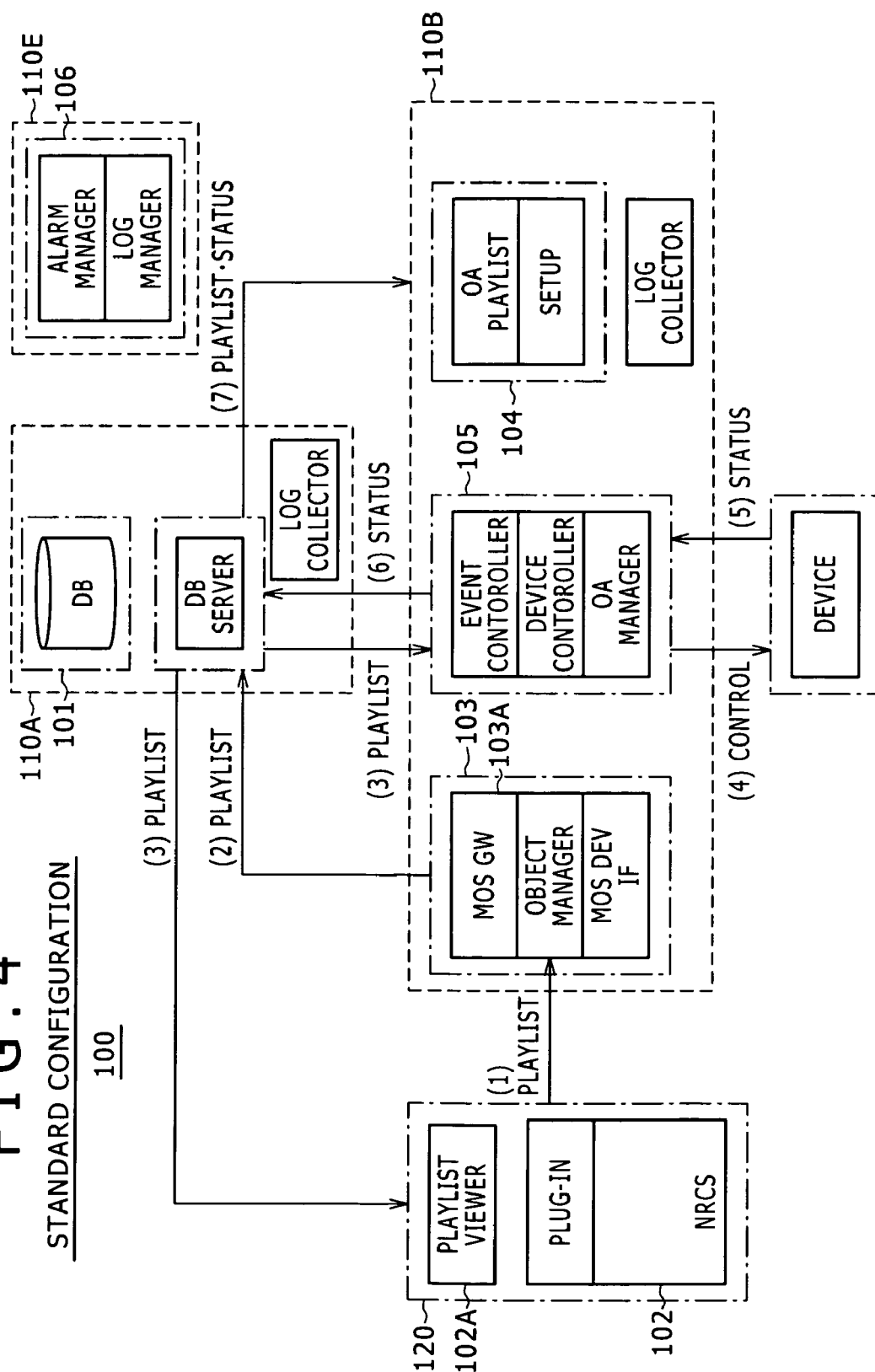
FIG. 4 is a schematic view showing another typical implementation of the software blocks of the program delivery control system.

FIG. 4 shows another typical implementation of the software blocks of the program delivery control system 100. In this implementation, the database section 101 is installed in a single computer 110A. The log/alarm manager section 106 is installed in another computer 110E. The NRCS interface section 103, on-air playlist/setup section 104, and device controller section 105 are installed in still another computer 110B. The NRCS plug-in/playlist viewer section 102 is installed in the customer's computer 120 in which an NRCS client has been installed.

Figure 5:
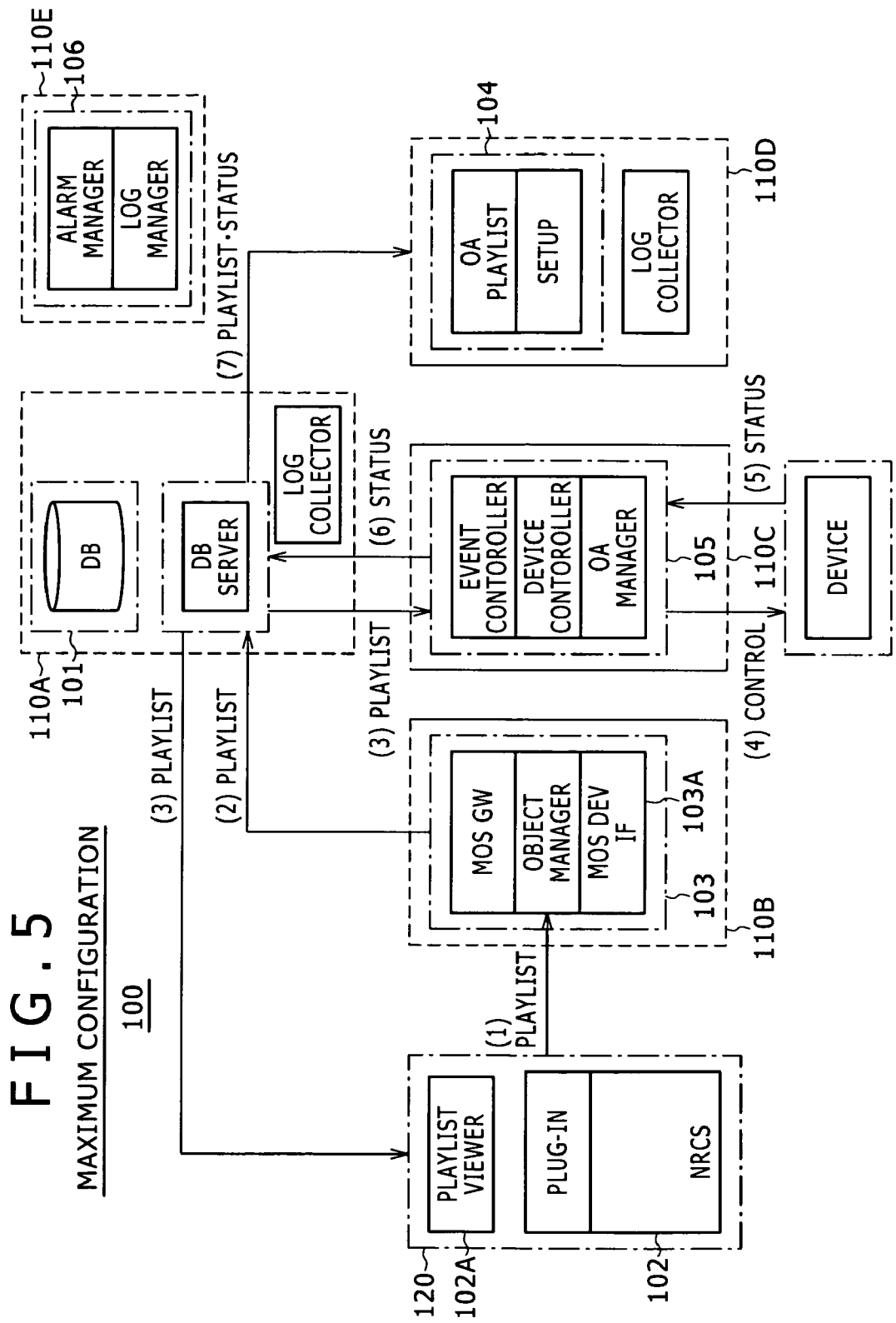
FIG. 5 is a schematic view showing still another typical implementation of the software blocks of the program delivery control system.

FIG. 5 shows still another typical implementation of the software blocks of the program delivery control system 100. In this implementation, the database section 101 is installed in a single computer 110A. The log/alarm manager section 106 is installed in another computer 110E. The NRCS interface section 103, on-air playlist/setup section 104, and device controller section 105 are installed separately in computers 110B, 110C and 110D, respectively. The NRCS plug-in/playlist viewer section 102 is installed in the customer's computer 120 in which an NRCS client has been installed.

As described above, when the log/alarm manager section 106 is installed in an independent computer 110E, an independent system for fault detection can be established. Where the database section 101 is installed in the independent computer 110E, the degree of freedom in configuring the database in the system is enhanced.

[Details of the Block Structure Centering on the Database Server]

Figure 6:
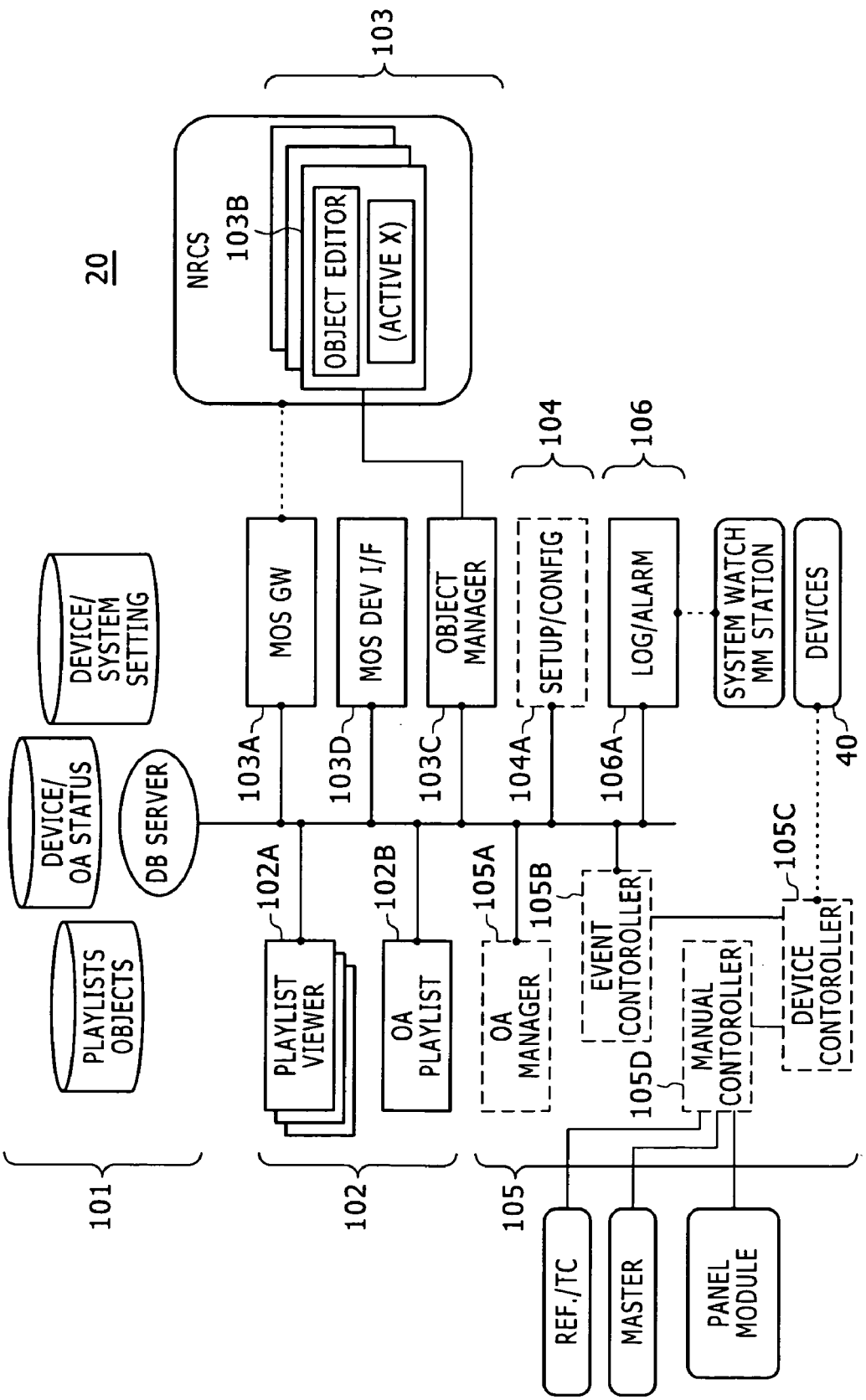
FIG. 6 is a schematic view showing a typical block structure centering on a database server of a database section in an automation system.

Explained below in detail is the block structure centering on the database (DB) server of the database section 101 in the automation system. FIG. 6 shows a typical block structure centering on the database server.

The NRCS interface section 103 includes an MOS gateway (GW) 103A, an object editor 103B, an object manager 103C, and an MOS device interface (I/F) 103D.

The MOS gateway 103A performs communication with the NRCS block 20 under the MOS protocol to update the database section 101. Specifically, the MOS gateway 103A receives a rundown (running order) from the NRCS block, converts the received rundown into a playlist, and writes the playlist to the database section 101.

The object editor 103B sets objects for the devices connected to the automation system. The devices connected to the automation system include the switcher 41, audio mixer 47, robotics cameras 46, and video clip server 43. The object editor 103B is activated from the NRCS block 20 to display, create and modify the objects on the database. Also, the object editor 103B exchanges objects with the database section 101 via the objector manager 103C.

The object manager 103C manages the objects edited by the object editor 103B, reads objects from the database section 101, and writes objects to the database section 101. The MOS device interface 103D acquires status and channel assignment information about MOS devices and writes the acquired information to the database section 101.

Also, the NRCS plug-in/playlist viewer section 102 graphically displays the status of the playlist that has been created or being put on the air. The NRCS plug-in/playlist viewer section 102 includes a playlist viewer 102A for displaying the playlists of the automation system and an on-air (OA) playlist 102B for displaying the playlist being put on the air.

The playlist viewer 102A displays the details of the playlists created or modified by the NRCS block 20. The on-air playlist 102B displays and manages the progress of the playlist being put on the air. The on-air playlist 102B displays the playlist currently on the air as well as the current on-the-air position. Also, the on-air playlist 102B displays standby status of video and audio materials. Furthermore, the on-air playlist 102B designates the next item/configuration.

The device controller section 105 controls various devices through an operator console (with MVS CCP, JL cooper modules) according to playlists. The device controller section 105 includes an on-air (OA) manager 105A, an event controller 105B, a device controller 105C, and a manual controller 105D.

The on-air manager 105A conducts on-the-air management. Specifically, when operations are carried out to start or stop a playlist, the on-air manager 105A notifies the device controller section 105 that the playlist is started or carries out processes to put the playlist on standby or to bring it to an end.

The event controller 105B executes one of the events in the playlist. Specifically, the event controller 105B gives the device controller 105C operation instructions desired for the next standby according to the playlist in the database section 101.

Also, the event controller 105B provides a series of operation instructions to be carried out at on-air time. Specifically, the event controller 105B sends an on-air timing (take trigger) signal to the device controller 105C. In this case, the event controller 105B creates and transmits a symbolic command/timeline so as to send the on-air timing signal to the device controller 105C.

Furthermore, the event controller 105B stores device status into the database section 101.

The manual controller 105D generates an on-air timing (take trigger) signal manually, periodically, or upon notification from the master switcher. Also, the manual controller 105D performs assignable event/device controls using a utility/shot-box module and other modules. The manual controller 105D further carries out controls such as take and chase necessary for playlist execution. The manual controller 105D also carries out a temporary event by quick recall. Furthermore, the manual controller 105D controls individual devices.

The device controller 105C controls devices. Specifically, the device controller 105C interprets symbolic commands in abstract form for conversion into a suitable protocol whereby the devices are controlled. Also, the device controller 105C converts the protocol into abstract status and gives notification of the status to the event controller 105B. In addition, the device controller 105C retains the timeline of symbolic commands and provides synchronous control using the on-air timing (take trigger) signal.

The on-air playlist/setup section 104 uses a setup/config 104A to set an automation core system and configure control devices. The log/alarm manager section 106 uses a log/alarm manager 106A to collect logs and alarms from various terminals. If a fault is detected, the log/alarm manager section 106 gives notification of the fault to the SNMP manager as desired. The database section 101 provides unified control over information about playlists, events, settings and status.

[Structures of Key Elements and Key Software Modules of the Program Delivery Control System 100]

Figure 7:
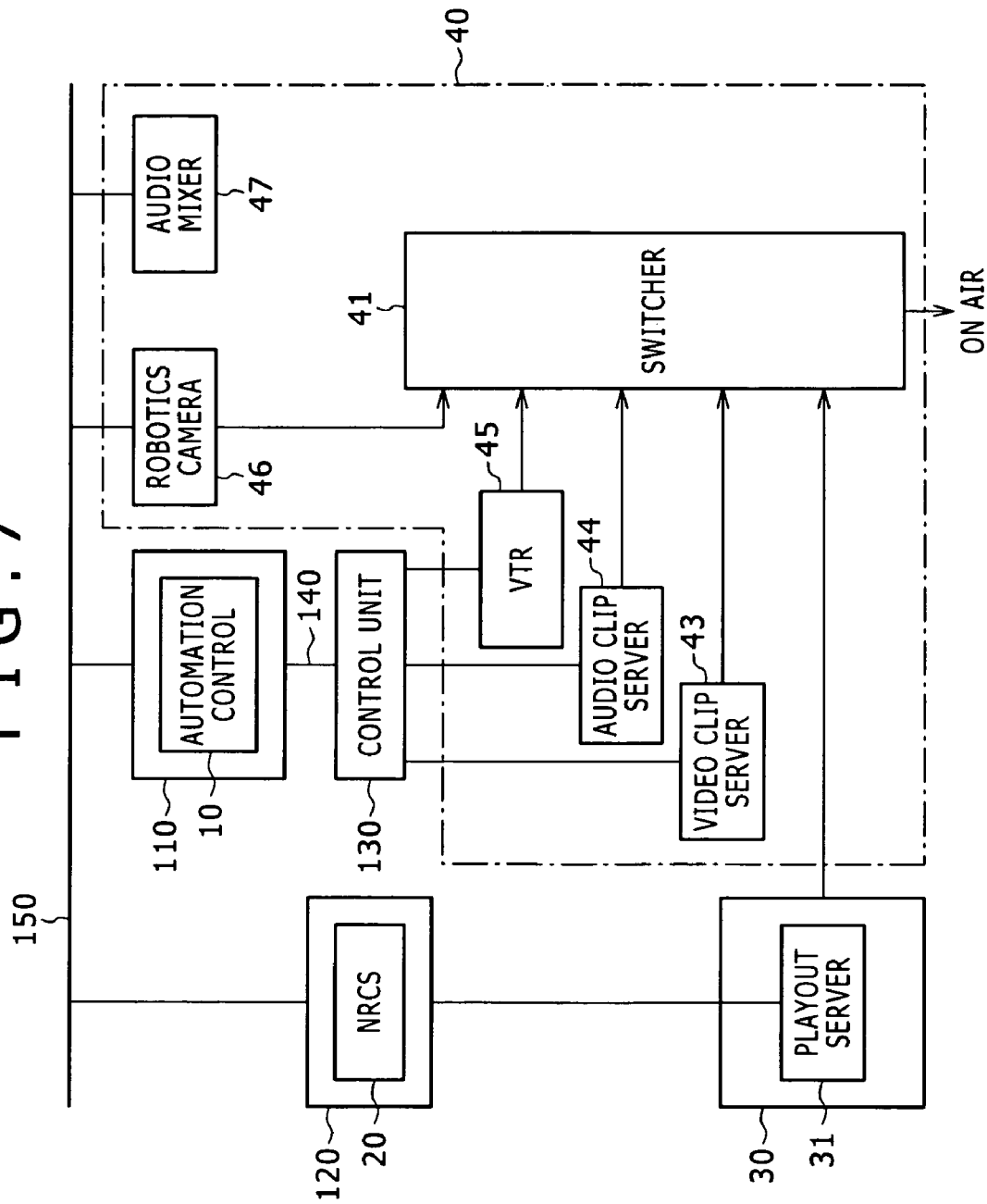
FIG. 7 is a schematic view showing a typical structure of key elements in the program delivery control system.
Figure 8:
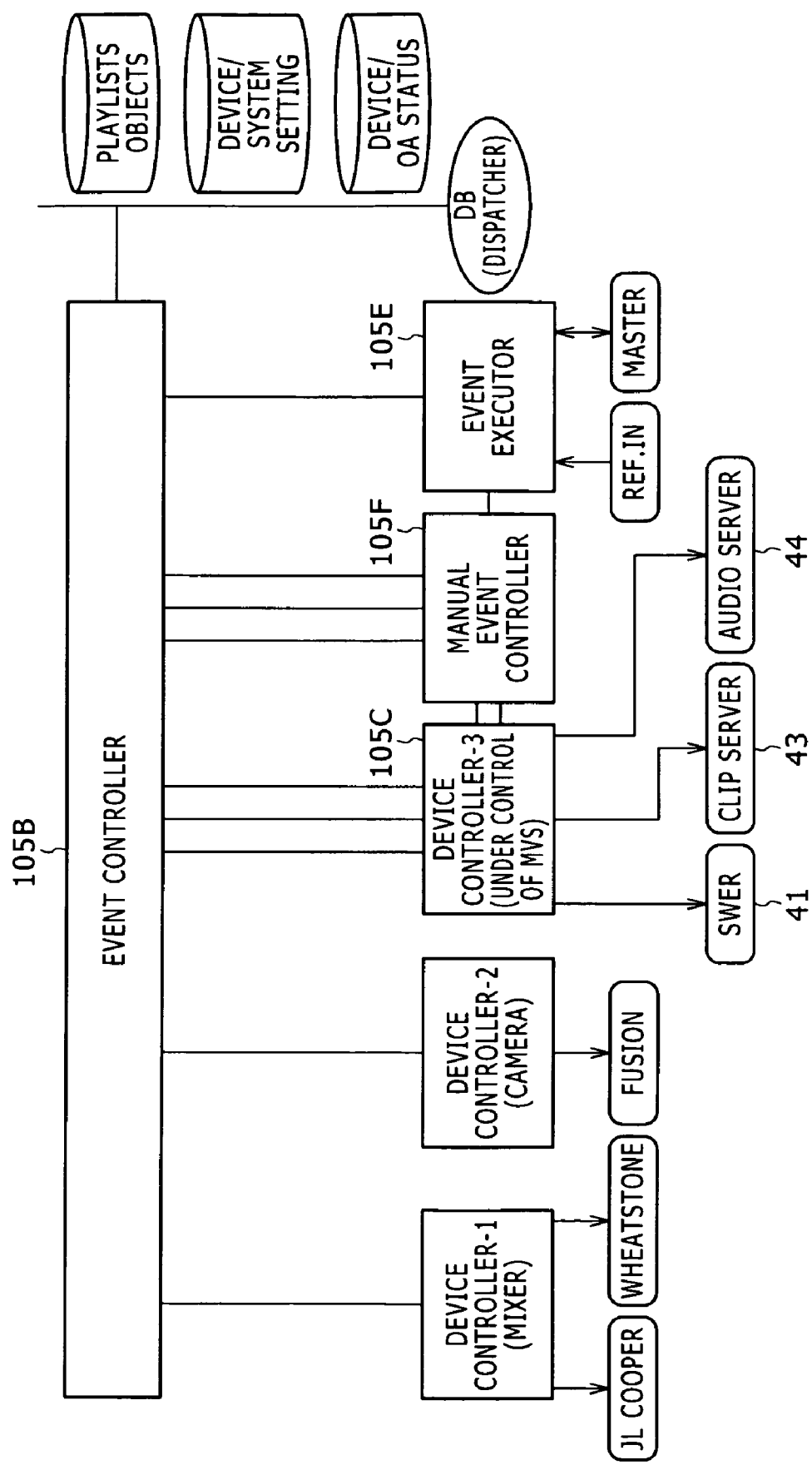
FIG. 8 is a schematic view showing a typical structure of key software modules of the program delivery control system.

FIG. 7 shows a typical structure of key elements in the program delivery control system 100. FIG. 8 shows a typical structure of key software modules of the program delivery control system 100.

Specifically, the program delivery control system 100 includes the automation control block 10 and NRCS block 20. The automation control block 10 controls delivery of the programs programmed on the basis of the software blocks installed in a first computer (automation control PC) 110. The NRCS block 20 performs administrative controls over news programs ranging from making arrangements for news gathering to placing orders for materials to preparing program configurations on the basis of the software blocks installed in a second computer 120.

The program delivery control system 100 also includes the MOS device block 30 made up of MOS devices such as the play-out server 31 and CG/still store 32. The MOS device block 30 is connected to the second computer 120 on a network.

Also, the program delivery control system 100 includes the automation control device block 40 made up of the switcher 41, device control unit (DCU) 42, video clip server 43, audio clip server 44, VTR 45, robotics cameras 46, and audio mixer 47. The automation control device block 40 is connected to the first computer 110 on a network.

Furthermore, the program delivery control system 100 includes a control unit (SCU) 130 having video reference input. The program delivery control system 100 also has a communication channel 140 connecting the control unit 130 with the first computer 110, and a network 150 connecting the first computer 110 with the second computer 120.

The control unit 130 is furnished with an event executor 105E as an execution management module that sends a video signal reference (Ref.In) to the first computer 110 through the communication channel 140.

The first computer 110 incorporates a software module for managing playlist information, and device driver software modules corresponding to controlled video devices. The first computer 110 also incorporates an event execution module that has a software interface through which device driver software modules can be added, and a software interface for interfacing with the device control modules in the control unit 130.

The event executor 105E is a software module that operates on the microcomputer of the control unit 130. Ref.In stands for the reference input through which reference signals (e.g., block burst signal) for the entire system are supplied to the control unit 130. The control unit 130 is structured so that its internal microcomputer is interrupted by a reference signal at intervals of a field.

When such an interrupt occurs, the event executor 105E gives notification of the interrupt to the other software modules in the microcomputer such as a manual event controller 105F. At the same time, the event executor 105E gives notification of the interrupt to the first computer (automation control PC) 110 through the communication channel 140. More specifically, the event executor 105E is in the state of waiting for a task. When the task wait state is canceled by an interrupt handling routine using a reference signal, the event executor 105E resumes task execution, handles the interrupt as described above, and again enters the task wait state after the interrupt is processed.

When notified of the interrupt, the manual event controller 105F handles a number of processes collectively at intervals of one field. For example, the control unit 130 is furnished with pushbuttons for controlling the switcher. When these pushbuttons are pressed, the manual event controller 105F notifies the switcher 41 of the pushbutton operations using commands transmitted through the communication channel, the switcher 41 being an automation control device inside the automation control device block 40.

Transmission of the signals takes place at intervals of one field, so that there will be no delays in terms of control with no decline in efficiency due to excessively frequent communications. The manual event controller 105F accumulates information about the pressed pushbuttons and, using an interrupt notice, transmits the accumulated information in command form to the switcher 41 as pushbutton operation information per field. Also, the manual event controller 105F not only transmits the commands to the switcher 41 but also sends the pushbutton operation information and other data to the first computer (automation control PC) 110.

The event controller 105B, one of the software modules in the first computer (automation control PC) 110, controls execution of control events regarding various devices in accordance with playlist information. The progress of the playlist is controlled according to time code. Upon receipt of notification at intervals of one field from the control unit 130, the event controller 105B can control the progress using the notification as time information. Two fields make up one frame if the interlace scheme is in operation, so that the time code in incremented by "1" when the notification is received twice.

When the time code arrives at a predetermined position (time position), the operation applicable to that position is carried out. It is assumed here that the device controller as a software module in the first computer 110 is a first device controller and that the device controller as a software module in the control unit 130 is a second device controller. The event controller 105B gives instructions according to the playlist to at least one of the first and the second device controllers.

Each of the device controllers converts the instructions into native protocols for controlled devices (i.e., a particular protocol native to each controlled device) before transmitting the instructions through ports (such as RS422 or the Ethernet (registered trademark)). The devices to be controlled through interfaces compatible with the RS422 or with a dedicated LAN (i.e., interfaces not found generally on the PC) are connected to the DCU 42 that covers the ports of the control unit 130 and controlled thereby. On the other hand, the devices connected to the general-purpose Ethernet are connected to the PC and controlled thereby likewise.

The device controller in the control unit 130 (i.e., second device controller) controls the switcher 41, video tape recorder 45, etc., in the automation control device block 40 in synchronism with the reference signal. As a result, the program delivery control system 100 enables the devices controlled by the first computer (automation control PC) 110 to operate in synchronization with the control unit 130.

Because the use of communication channels on the Ethernet eliminates the need to equip the first computer (automation control PC) 110 with hardware arrangements for receiving the reference signal, costs can be reduced appreciably. It is also possible to configure the system flexibly as shown in FIGS. 3, 4 and 5. Since the computer can be replaced with a general-purpose computer when necessary, costs can be further reduced.

Conversion of instructions into native protocols for the devices connected to the control unit 130 is carried out by the control unit 130. That means the first computer (automation control PC) 110 is not overloaded. With processing load thus dispersed, the devices involved can be controlled economically with no delay in synchronization with the reference signal.

In FIG. 8, the device named a master connected to the event executor 105E denotes a master switcher. The master switcher in a broadcasting station is a switching device installed hierarchically above the switcher or this system. Whereas this system is attached to a particular studio or other limited facility, the master switcher distributes video signals throughout the entire broadcasting station.

The control unit (SCU) 130 receives instructions and timing signals from the master through ports such as GPI (General Purpose Interface). GPI is a port that receives simple on/off signals through parallel ports for use as instructions and triggers. The master switches the output of the station between the output from the studio and CMs. Upon switchover from a CM to the studio output, the automation system is triggered by GPI to start the configuration at the end of the CM delivery. In this case, the switchover is initiated by the master. Conversely, it is also possible to trigger the master from the studio through GPI for switchover to a CM delivery.

Also, the event executor 105E performs relays between the master switcher and other software modules as well as between the master switcher and the first computer (automation control PC) 110. Delays in relays have to be guaranteed not to exceed predetermined field units. For this reason, the event executor 105E reads the GPI input whenever operation is started in a manner timed by the reference signal. If a level change occurs, the event executor 105E determines the type of the instruction based on the GPI port settings in effect and, according to the instruction type thus determined, gives notification the instruction to the other software modules and/or to the first computer (automation control PC) 110.

When output is to be made through GPI, the event executor 105E handles in units of fields the instructions received from the other software modules and from the first computer (automation control PC) 110. Specifically, when starting operation in a manner timed by the reference signal, the event executor 105E puts the received instructions together and changes the level of the GPI output in accordance with the settings of each GPI port.

There exist a plurality of processes to be handled by the event executor 105E in a manner timed by the reference signal. Execution of the processes per field is desired for the event executor 105E to limit any delay in the processing to one field or less (two fields or less from reception until completion of transmission). The upper limit of the delay can be observed without the order of the processes being designated precisely.

In the setup of FIG. 6, Microsoft SQL Server may be used as a data server for the database section 101. When an application updates the database section 101, the data server notifies the other applications of the changed items using MS SQL functions. This feature is called the dispatcher. More precisely, each application registers the items of which the application in question is desirous of being notified of any change. Given notification of such a change, the application accesses the database section 101 to read the change. If there is any change in the configuration subsequent to the current point in time in the playlist or if the sequence of the configuration in the playlist has been changed, the first computer 110 makes preparations for the change in control using this feature.

As described, in the program delivery control system 100, the control unit 130 having the reference input sends the reference timing signal to the first computer 110. Given the reference timing signal, the event executor 105E controls the device drive software modules in the first computer 110 and the device control modules in the control unit 130.

In this manner, the program delivery control system 100 controls the video devices furnished with diverse control interfaces according to the playlist in synchronism with the reference timing signal. This makes it possible to implement delivery control in keeping with the NRCS block 20 without faulty timings.

[Structure of the Switcher]

Figure 9:
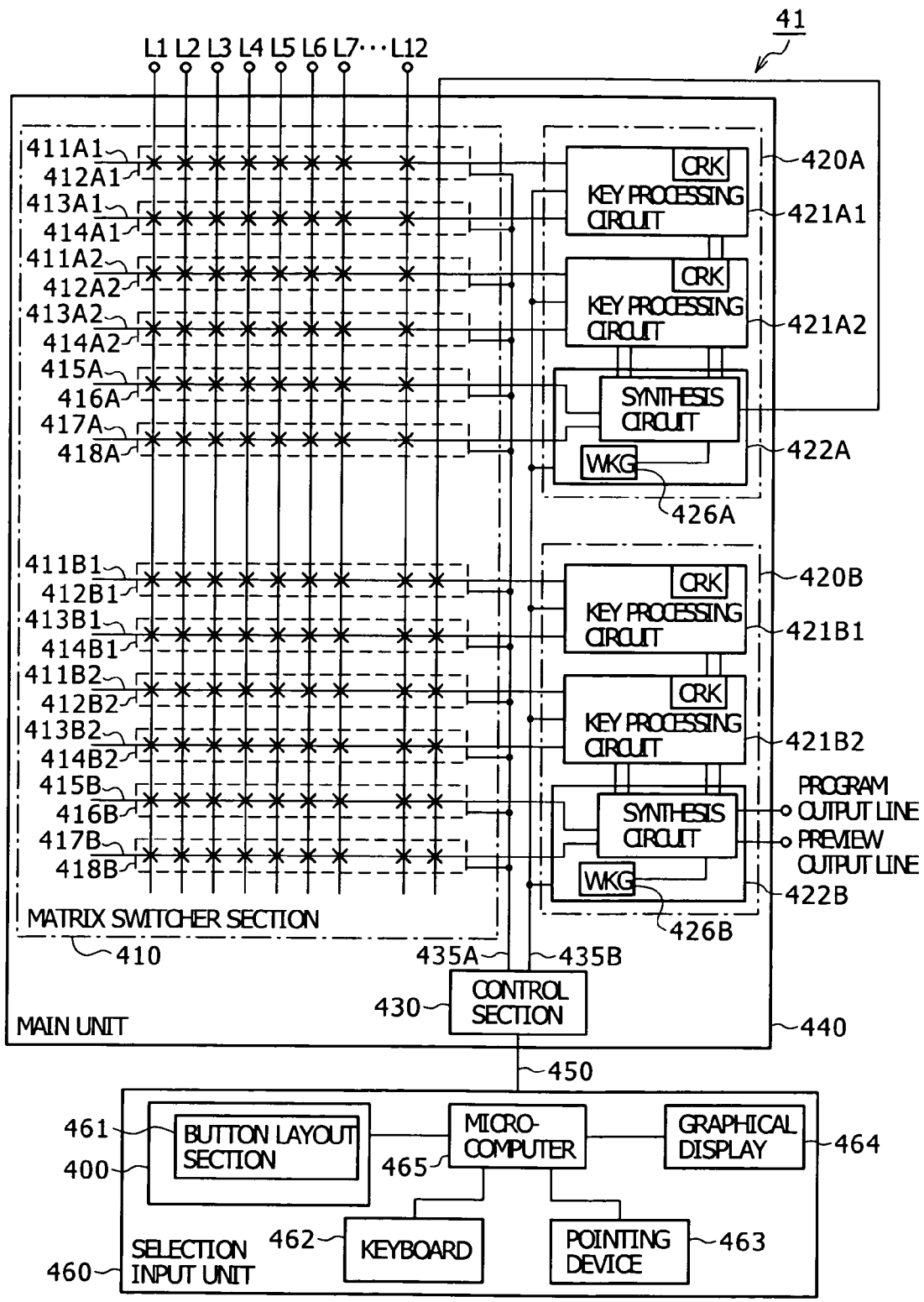
FIG. 9 is a schematic view showing a typical structure of a switcher.

The switcher 41 will now be explained. FIG. 9 shows a typical structure of the switcher 41. The switcher 41 includes a main unit 440 and a selection input unit 460 connected to the main unit 440 via a communication channel 450. The main unit 440 includes a matrix switcher section 410, a first picture processing section 420A, a second picture processing section 420B, and a control section 430. The first picture processing section 420A and that portion of the matrix switcher section 410 which corresponds to the first picture processing section 420A make up a first ME bank. The second picture processing section 420B and that portion of the matrix switcher section 410 which corresponds to the second picture processing section 420B constitute a second ME bank.

The matrix switcher section 410 selects video signals input to the input lines L1 through L12. The video signals input to the input lines L1 through L12 are supplied to the first and the second picture processing sections 420A and 420B through the matrix switcher section 410. The control section 430 controls the matrix switcher section 410, first picture processing section 420A, and second picture processing section 420B in operation.

The input lines L1 through L12 of the switcher 41 are fed with video signals to be used as a key source signals or a key fill signal, as well as with video signals to be used as a background video signal. The matrix switcher section 410 is furnished with key source cross point rows 412A1 and 412A2. The key source cross point rows 412A1 and 412A2 are made up of the switches which select one of the video signals input to the input lines L1 through L12 as a key source signal and supply the selected key source signal to the first picture processing section 420A and which are connected to key source signal selection input buses 411A1 and 411A2.

The matrix switcher section 410 is also furnished with key fill cross point rows 414A1 and 414A2. The key fill cross point rows 414A1 and 414A2 are made up of the switches which select one of the video signals input to the input lines L1 through L12 as a key fill signal and supply the selected key fill signal to the first picture processing section 420A and which are connected to key fill signal selection input buses 413A1 and 413A2.

The matrix switcher section 410 further includes a first background cross point row 416A. The first background cross point row 416A is made up of the switches which select one of the video signals input to the input lines L1 through L12 as a first background signal and supply the selected first background signal to the first picture processing section 420A and which are connected to a first background signal selection input bus 415A. The matrix switcher section 410 also includes a second background cross point row 418A. The second background cross point row 418A is made up of the switches which select one of the video signals input to the input lines L1 through L12 as a second background signal and supply the selected second background signal to the first picture processing section 420A and which are connected to a second background signal selection input bus 417A.

The matrix switcher section 410 is further provided with key source cross point rows 412B1 and 412B2. The key source cross point rows 412B1 and 412B2 are made up of the switches which select one of the video signals input to the input lines L1 through L12 and to the output lines of the first ME bank as a key source signal and supply the selected key source signal to the second picture processing section 420B and which are connected to key source signal selection input buses 411B1 and 411B2.

The matrix switcher section 410 is also furnished with key fill cross point rows 414B1 and 414B2. The key fill cross point rows 414B1 and 414B2 are made up of the switches which select one of the video signals input to the input lines L1 through L12 and to the output lines of the first ME bank as a key fill signal and supply the selected key fill signal to the second picture processing section 420B and which are connected to key fill signal selection input buses 413B1 and 413B2.

The matrix switcher section 410 further includes a first background cross point row 416B. The first background cross point row 416B is made up of the switches which select one of the video signals input to the input lines L1 through L12 and to the output lines of the first ME bank as a first background signal and supply the selected first background signal to the second picture processing section 420B and which are connected to a first background signal selection input bus 415B. The matrix switcher section 410 also includes a second background cross point row 418B. The second background cross point row 418B is made up of the switches which select one of the video signals input to the input lines L1 through L12 and to the output lines of the first ME bank as a second background signal and supply the selected second background signal to the second picture processing section 420B and which are connected to a second background signal selection input bus 417B.

The first picture processing section 420A is constituted by key processing circuits 421A1 and 421A2 and by a synthesis circuit 422A. The key processing circuits 421A1 and 421A2 are connected to the key source signal selection input buses 411A1 and 411A2 and to the key fill signal selection input buses 413A1 and 413A2. The key source signal and the key fill signal selected from the video signals input to the input lines L1 through L12 are input to the key processing circuits 421A1 and 421A2 through the key source signal selection input buses 411A1 and 411A2 as well as through the key fill signal selection input buses 413A1 and 413A2. The key processing circuits 421A1 and 421A2 generate a key signal corresponding to control signals from the control section 430 by use of the input key source signal or an internal waveform generation circuit (wipe pattern generation circuit). And the key processing circuits 421A1 and 421A2 feed the key signal and key fill signal to the synthesis circuit 422A.

The synthesis circuit 422A is connected to the key processing circuits 421A1 and 421A2 as well as to the first and the second background signal selection input buses 415A and 417A. The key signal and the key fill signal are input to the synthesis circuit 422A from the key processing circuits 421A1 and 421A2. Also, the first and the second background signals selected from the video signals input to the input lines L1 through L12 are input to the synthesis circuit 422A through the first and the second background signal selection input buses 415A and 417A. Under control of the control section 430, the synthesis circuit 422A selectively uses the key signal and key fill signal supplied from the key processing circuit 421A1 or 421A2. Also under control of the control section 430, the synthesis circuit 422A performs a keying process whereby the area indicated by the key signal is replaced with the first or the second background signal to synthesize the key fill signal.

The second picture processing section 420B is constituted by key processing circuits 421B1 and 421B2 and by a synthesis circuit 422B. The key processing circuits 421B1 and 421B2 are connected to the key source signal selection input buses 411B1 and 411B2 as well as to the key fill signal selection input buses 413B1 and 413B2. The key source signal and the key fill signal selected from the video signals input to the input lines L1 through L12 and to the output lines of the first ME bank are input to the key processing circuits 421B1 and 421B2 through the buses 411B1 and 411B2 as well as through the key fill signal selection input buses 413B1 and 413B2. The key processing circuits 421B1 and 421B2 generate a key signal corresponding to the control signal from the control section 430 by use of the input key source signal or the internal waveform generation circuit (wipe pattern generation circuit). And the key processing circuits 421B1 and 421B2 feed the key signal and key fill signal to the synthesis circuit 422B.

The synthesis circuit 422B is connected to the key processing circuits 421B1 and 421B2 as well as to the first and the second background signal selection input buses 415B and 417B. The key signal and the key fill signal are input to the synthesis circuit 422B from the key processing circuits 421B1 and 421B2. Also, the first and the second background signals selected from the video signals input to the input lines L1 through L12 and to the output lines of the first ME bank are input to the synthesis circuit 422B through the first and the second background signal selection input buses 415B and 417B. Under control of the control section 430, the synthesis circuit 422B selectively uses the key signal and key fill signal supplied from the key processing circuit 421B1 or 421B2. Also under control of the control section 430, the synthesis circuit 422B performs a keying process whereby the area indicated by the key signal is replaced with the first or the second background signal to synthesize the key fill signal.

In the foregoing description, the key signal was shown to be a binary signal designating either the background signal or the key fill signal. In practice, however, the key signal is not a binary but a multilevel signal indicating the degree of density at which the key signal is superposed onto the background signal. Thus it is possible to perform picture processing whereby the key fill signal is made partially translucent with the background still being visible.

The control section 430 is illustratively composed of a microcomputer. The control section 430 generates control signals corresponding to the selection input signal given by the selection input unit 460 through the communication channel 450, thereby controlling the matrix switcher section 410, first picture processing section 420A, and second picture processing section 420B in operation by way of control lines 435A and 435B.

The selection input unit 460 is formed by a microcomputer 465 connected with a button layout section 461, a keyboard 462, a pointing device 463 such as a mouse, and a graphical display 464. When buttons of the button layout section 461 are operated for input selection, the matrix switcher section 410 of the main unit 440 controls the cross point row connected to the applicable input bus to select the input and to supply the video signal to the applicable picture processing section. Following execution of the designated processing such as synthesis by the picture processing section, the video signal constituting the picture including the selected input video signal is output.

Where the dual link scheme is in effect under which progressive video signals are processed in pairs, the paths for the picture are paired (i.e., side A and side B). Operations are then performed so that the paired input is selected on each of the side A and side B.

In the switcher 41 shown in FIG. 9, the selection input unit 460 communicates with the control section 430 of the main unit 440 through the communication channel 450, giving instructions to execute various processes. The synthesis circuit 422A receives inputs from the first and the second background signal selection input buses 415A and 417A and, in keeping with the instructions from the selection input unit 460, selects one of the background signals as the background signal for use in the keying process. Alternatively, in keeping with the instructions from the selection input unit 460, the synthesis circuit 422A synthesizes two background signals at a designated ratio into the background signal for use in the keying process.

The ratio is manually designated illustratively by operation of a fader lever on the selection input unit. In the case of an automatic transition (i.e., automatic progress) operation, control is exercised to change the ratio over time so that one background signal is gradually replaced by the other background signal. One way of achieving synthesis is by weighting the two background signals per pixel at the above-mentioned ratio before adding up the weighted signals. For example, if the ratio is 30 percent, then the value of the first background signal is multiplied by 0.3 and the value of the second background signal by 0.7 before they are added up.

Another way of accomplishing synthesis is by superposing the second background signal onto the first background signal through the keying process by use of a wipe key signal supplied from a wipe key generator (WKG). The key signal generated by the wipe key generator varies with the above-mentioned ratio. Where automatic transition is in effect, the key signal is generated so that the wipe boundary is determined using the times of progress as input parameters. If automatic transition is not in effect, then the key signal is generated using the designated ratio instead of the times. The above also holds for the synthesis circuit 422B.

Figure 10:
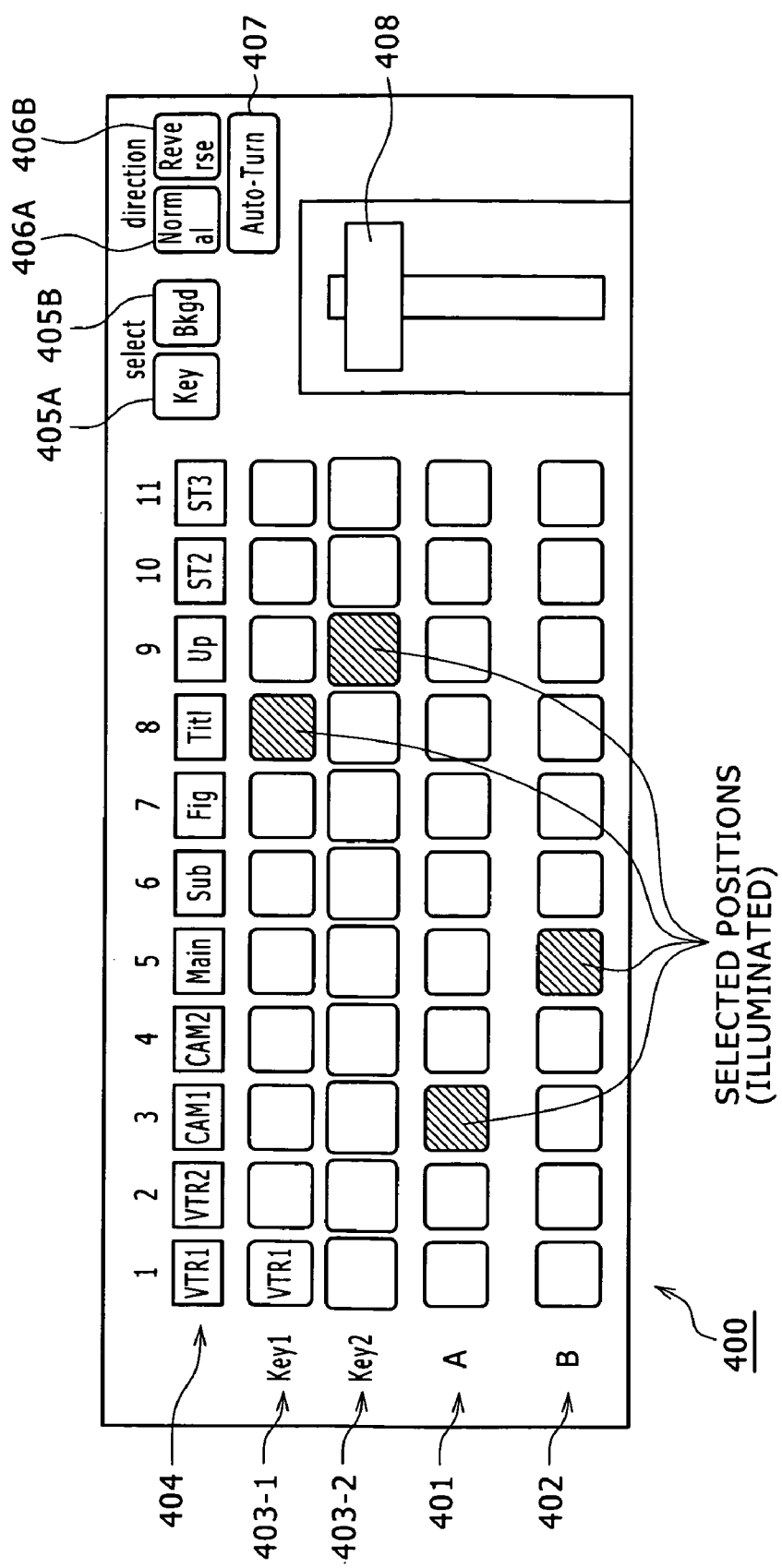
FIG. 10 is an external view of an operator console of the switcher.

FIG. 10 is an external view of an operator console 400 of the switcher 41. Where the dual link scheme is not in effect, the operator console 400 acts as an operating part corresponding to one of the picture processing sections of the main unit 440. If the dual link scheme is in effect, the operator console 400 serves as an operating part corresponding to the paired picture processing sections.

As shown in FIG. 10, the operator console 400 is furnished with a first background button row 401, a second background button row 402, and key button rows 403-1 and 403-2. The operator console 400 also includes a source name indicator row 404, transition target buttons 405A and 405B, direction designation buttons 406A and 406B, a reciprocating mode designation button 407, and a fader lever 408.

The first background button row 401 is operated to select the input line through which the first background signal selection input bus 415A supplies the video signal for use as the background video signal to the synthesis circuit 422A. The second background button row 402 is operated to select the input line through which the second background signal selection input bus 417A supplies the video signal for use as the background video signal to the synthesis circuit 422A.

The key button rows 403-1 and 403-2 are operated to select the combination of the first and the second input lines through which to supply the video signals for use as the key source signal and key fill signal to the key processing circuits 421A1 and 421A2. In this case, the key source signal selection input buses 411A1 and 411A2 supply the video signal for use as the key source signal through the first input line to the key processing circuits 421A1 and 421A2. The key fill signal selection input buses 413A1 and 413A2 supply the video signal for use as the key fill signal through the second input line to the key processing circuits 421A1 and 421A2.

The source name indicator row 404 displays character information associated with the index numbers corresponding to the button numbers of the buttons laid out underneath the indicators as shown in FIG. 10. The character information, stored in the control section 430, can be set by the user. Alternatively, the character information may be stored corresponding to the input line numbers. In this case, one of two kinds of character information is displayed: character information associated with the first input line number corresponding to the index numbers related to the button numbers of the buttons, or character information associated with the second input line number corresponding to the index numbers.

The first input line number is the number for selecting the video signal for use as the key fill signal, and the second input line number is the number for selecting the video signal for use as the key source signal. For this reason, the first and the second input line numbers are paired in relation to the index numbers corresponding to the button numbers. This makes it possible for the key button rows to select the combination of the first and the second input lines through which the video signals for use as the key source signal and key fill signal are supplied to the key processing circuits.

Where the background button row is operated, the first input line number is used to select the background video signal. The source name indicators 404 may be arranged usually to display the character information corresponding to the first input line number, or to display the character information corresponding to the second input line number while a separately provided button, not shown, is being pressed. This arrangement allows the operator to verify the two kinds of character information. The correspondence between the index numbers related to the button numbers on the one hand and the input line number associated with the index numbers on the other hand is called cross point button assignments. On the operator console 400, selected buttons (switches) are illuminated.

In the program delivery control system 100, channel assignment information is acquired by the NRCS block 20 from the play-out server 31, and those cross points (XPT) of the switcher 41 which are set in the playlist of the automation control block 10 are automatically selected. That is, the channel assignment information of the play-out server 31 is transferred to the NRCS block 20 under the MOS protocol.

The automation control block 10 acquires the channel assignment information of the play-out server 31 by means of roStorySend or FTP of the MOS protocol. On the basis of the channel assignment information, the automation control block 10 sets or changes the cross points of the switcher 41.

Figure 11:
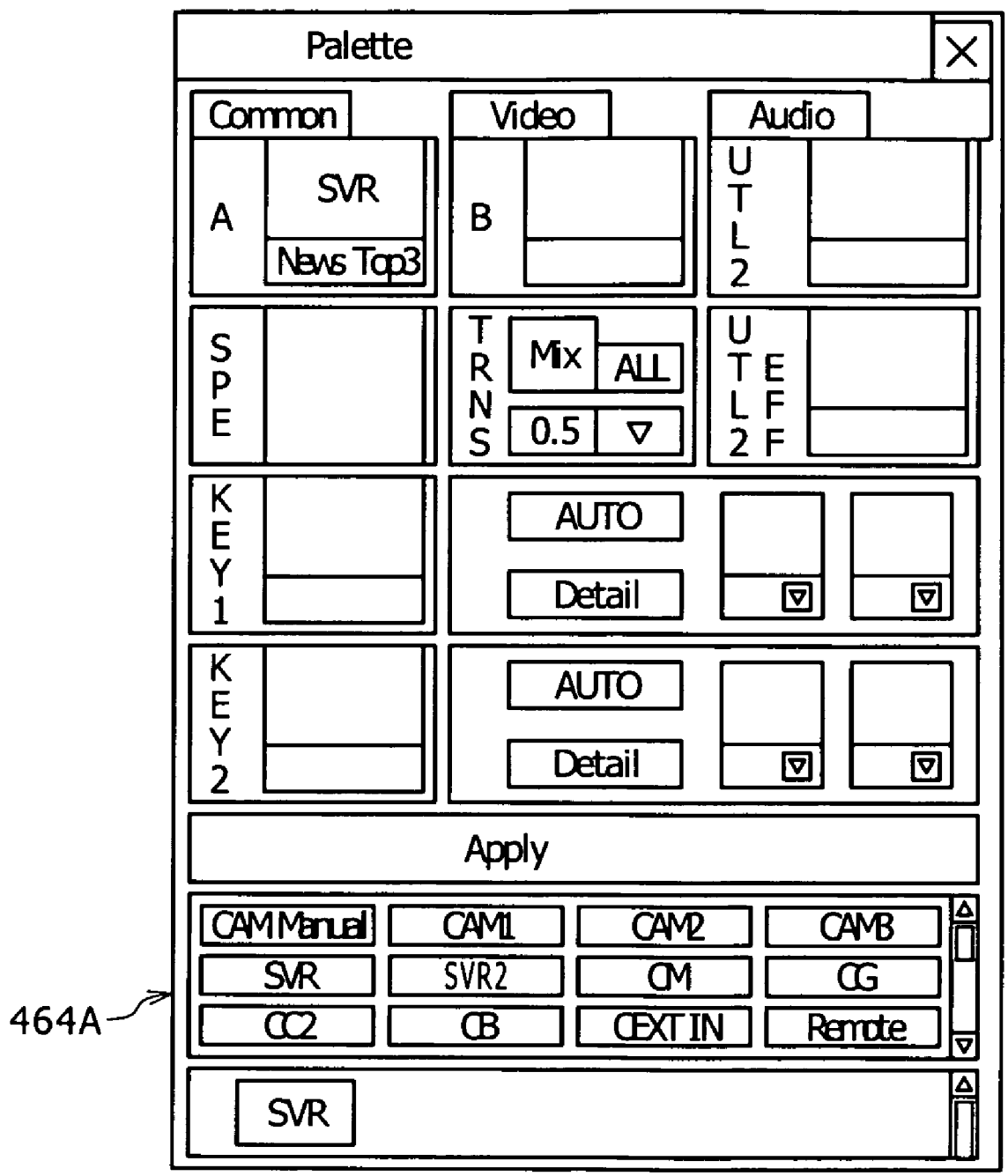
FIG. 11 is a schematic view showing a palette with SVR selected therein from the operator console.

In the preparation of a playlist, the play-out server 31 alone is set as the video source and no channel is set. Specifically, when SVR is selected using a palette 464A of FIG. 11 on the display screen of the graphical display 464, SVR is set in a playlist 464B of FIG. 12 but no channel is set. Upon acquiring channel information from the NRCS block 20, the automation control block 10 displays the channel information of the play-out server 31 in the playlist and sets the cross points of the switcher 41 accordingly.

In the program delivery control system 100, the automation control block 10 installed in the first computer 110 executes the playlist. In this case, when the play-out server 31 outputs a given material through the output channel, the automation control block 10 references the material information, the channel assignment information, and the playlist provided by the NRCS block 20.

In keeping with a material selection schedule in the playlist and a processing schedule of the switcher 41, the automation control block 10 uses a suitable bus of the switcher 41 to give instructions to select the input connected to the output channel of the play-out server 31. For example, if some material in the playlist is scheduled to be used as the background image, the suitable bus may be one of the background signal selection input buses, with the cross points of the selected bus selecting the applicable input.

Alternatively, where a subtitle material is subject to the keying process, the cross points between the key source signal selection input bus and the key fill signal selection input bus are used to select the applicable input for use as the material. As another alternative, if a child window is to be displayed in picture-in-picture form, the key fill signal selection input bus is used to select the applicable input whereby the video signal of the material is acquired. The video signal is subjected to reduction or like processing so that a key signal covering solely the child window within the key processing circuit will be generated. The child window is thus formed and subjected to the keying process without the use of an external video signal by way of the key source signal selection input bus.

Thereafter, the information about the material acquired from the first computer 110 is displayed in the source name indicator row 404 on the operator console 400 of the switcher 41, the indicator row 404 forming a display section with its positions corresponding to the operation buttons for selecting the input connected to the output channel of the play-out server 31. In this case, the operation buttons for selecting the input connected to the output channel of the play-out server 31 are the first background button row 401, second background button row 402, and key button rows 403-1 and 403-2.

In the switcher 41, the control section 430 is furnished with a corresponding relation storage section capable of setting the corresponding relations between the operation buttons of the operator console 400 on the one hand and the input of the switcher 41 on the other hand. Through the output channel of the play-out server 31, the first computer 110 sends instructions about the above-mentioned corresponding relations regarding the input of the switcher 41 connected to the program scheduled to be used, the corresponding relations being assigned to the operation buttons of the operator console 400. The instructions regarding the corresponding relations include information about materials. The material information, in this example, is displayed by the source name indicators 404 in relation to the operation buttons of the operator console 400.

When a material to be output through a given output channel is to be changed, such material servers as the video clip server 43 and audio clip server 44 besides the play-out server 31 may change the corresponding relations accordingly.

[Example of Program Delivery]

An example of program delivery by the program delivery control system 100 will now be explained. In this example, it is assumed that the output channels of material servers are CH1 and CH2 and that the materials output through the output channels CH1 and CH2 are clip A, clip B and clip C. It is also assumed that the output channels CH1 and CH2 of the material servers are connected to input 1 and input 2 of the switcher 41 and that the materials in the playlist (cue sheet) are used in the order shown in Table 1 below during picture processing by the switcher 41. The order in Table 1 is assumed to follow the progress of the playlist.

TABLE 1

|  | Time | | | | |
| --- | --- | --- | --- | --- | --- |
|  | t1 | t2 | t3 | t4 | t5 |
| Background | A | B | A | B | A |
| PinP | — | — | — | — | B |
| Subtitles | — | — | C | C | — |

That is, whereas only up to two channels can be used simultaneously, three materials are employed. A delivery control computer executes the above-described playlist. Because the material servers have two output channels, the outputs are effected in the order shown in Table 2 below. The content of Table 2 indicates the output channel information applicable to all times.

TABLE 2

|  | Time | | | | |
| --- | --- | --- | --- | --- | --- |
|  | t1 | t2 | t3 | t4 | t5 |
| CH1 | A | B | C | C | A |
| CH2 | — | — | A | B | B |

Because control of the switcher 41 is instructed as the input 1 and input 2, the order shown in Table 3 below comes into effect:

TABLE 3

|  | Time | | | | |
| --- | --- | --- | --- | --- | --- |
|  | t1 | t2 | t3 | t4 | t5 |
| Input 1 | A | B | C | C | A |
| Input 2 | — | — | A | B | B |

As a result, the instructions are given to the switcher 41 in the order indicated in Table 4 below. In table 4, numerals denote corresponding input numbers.

TABLE 4

|  | Time | | | | |
| --- | --- | --- | --- | --- | --- |
|  | t1 | t2 | t3 | t4 | t5 |
| Background | 1 | 1 | 2 | 2 | 1 |
| PinP | — | — | — | — | 2 |
| Subtitles | — | — | 1 | 1 | — |

Under automated control, the scheduled pictures can be output by executing cross point control (i.e., control of the matrix switcher section) in the manner described above. Where the possibility of switching to manual control is taken into account, it is preferable that the material names (A, B, C) be displayed on the source name display corresponding to the cross point buttons on the operator console 400 of the switcher 41. To implement this involves supplying the source name information to the switcher (i.e., system including the operator console) in order to associate the information with the material names. The source name information provides the switcher 41 with the names (character strings) corresponding to each of the inputs.

Table 5 below shows an example of the correspondence between the inputs to the switcher 41 and their sources (signal sources).

TABLE 5

| Switcher input No. | Source |
| --- | --- |
| 1 | CH1 of material server 1 |
| 2 | CH2 of material server 1 |
| 3 | CH1 of material server 2 |
| 4 | CH2 of material server 2 |
| 5 | CH3 of material server 2 |
| 6 | VTR 1 |
| 7 | VTR 2 |
| 8 | Studio camera 1 |
| 9 | Studio camera 2 |
| 10 | Relay mobile 1 |
| 11 | Relay mobile 2 |
| 12 | Relay mobile 3 |

Tables 6 and 7 below show typical settings of cross point button assignments. It is assumed here that the button numbers correspond to the input line numbers on a one-to-one basis.

TABLE 6

| Example 1 of assignments (without VTR) | | | | | | | |
| --- | --- | --- | --- | --- | --- | --- | --- |
|  | Button No. | | | | | | |
|  | 1 | 2 | 3 | 4 | 5 | 6 | 7 |
| Input No. | 1 | 2 | 8 | 9 | 10 | 11 | 12 |

TABLE 7

| Example 2 of assignments (without relay mobile) | | | | | | | |
| --- | --- | --- | --- | --- | --- | --- | --- |
|  | Button No. | | | | | | |
|  | 1 | 2 | 3 | 4 | 5 | 6 | 7 |
| Input No. | 1 | 2 | 8 | 9 | 6 | 7 | 3 |

Illustratively, with the assignments in Table 6, input line No. 1 is related to button No. 1. Thus according to Table 5, the indicator corresponding to button No. 1 displays "CH1 of material server 1," and the indicator corresponding to button No. 5 displays "Relay mobile 1."

As described, the automation control block 10 incorporated in the first computer 110 gives instructions in such a manner that only the signal sources to be used in the program are assigned to suitable buttons. Depending on the type of the play-out server 31, it may be impossible to output different materials continuously using the same channel. This constraint needs to be taken into account in controlling channel assignments.

In this case, operation is performed using two channels (CH1 and CH2) even if the program of interest typically uses a single material. Illustratively, the play-out server 31 may be controlled to output material A through CH1, material B through CH2, material C through CH1, and material A through CH2, in that order.

The cross points of the switcher 41 are assigned the inputs connected to CH1 and CH2. These cross points are controlled in such a manner that the applicable inputs may be selected for the materials to be used in the course of the program. This makes it possible to designate a particular material to be used at each particular point in time while the program is in progress. There is no need for the operator to become aware of which material to output through which channel; the switcher makes the selections correctly.

The information denoting which material to output through which channel may be acquired from the play-out server 31 over a time period before the first computer 110 performs each of such switches, the time period being long enough to permit preparations for control. The sufficiently long preparatory period may be secured for the information acquisition before the program is started or while the program is in progress.

Cognizant of the materials used in the playlist, the automation control block 10 can identify the materials to be used from the playlist. Since the materials to be used have been assigned to buttons, the necessary materials can be selected even if manual mode is entered at short notice.

Generally, the cross point buttons on the operator console 400 of the switcher 41 may be doubled in number when the Shift button is used concurrently. However, since the key operations involving the Shift key can be laborious, frequently used materials may preferably be assigned to buttons with lower button numbers (i.e., buttons not on the shift side) for convenience. Even if there are provided a sufficient number of buttons, the inputs to be used by the program of interest may preferably be assigned to the buttons with lower button numbers in order to ensure the ease of operation in eventual manual mode.

Even where the automation control block 10 sets cross point button assignments, the names of materials are still displayed on the source name indicator row 404 on the operator console 400 of the switcher 41. This leaves unhindered any manual operations involving VTR 1 and VTR 2, among others.

[Function Assignments to Operation Buttons on the OTC Panel]

In this embodiment, the above-mentioned first computer (automation control PC) 110 assigns functions to a plurality of operation buttons on the OTC panel 131 in accordance with the control of the switcher 41 based on each configuration in the playlist (cue sheet). The functions to be assigned to the operation buttons in this embodiment are the functions that designate selection of input video signals for the switcher 41.

Figure 13:
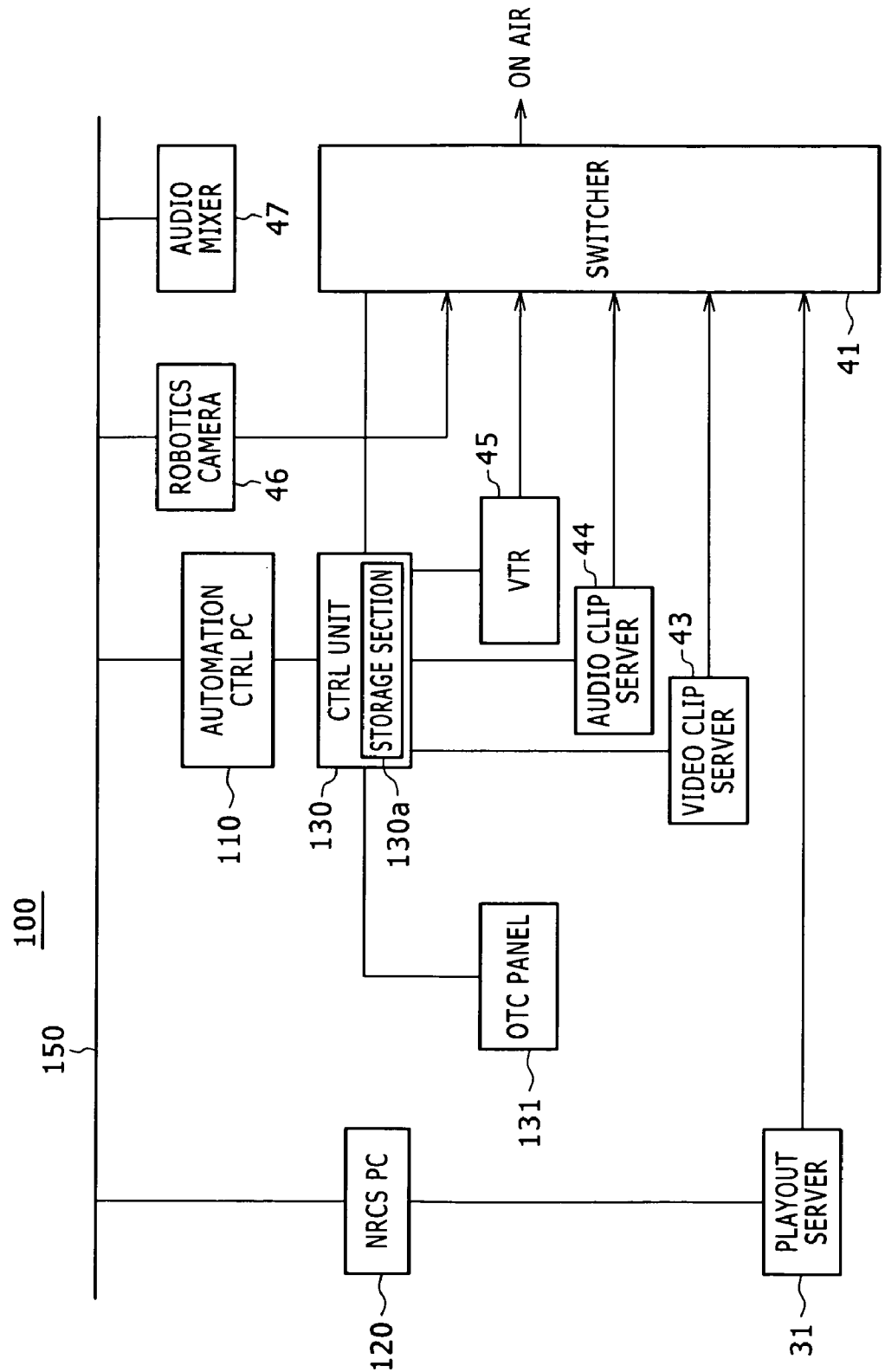
FIG. 13 is a schematic view showing a typical structure of key elements involved in assigning functions to operation buttons on an OTC panel of the program delivery control system.

FIG. 13 shows a typical structure of key elements involved in assigning functions to operation buttons on the OTC panel 131 as part of the program delivery control system 100 indicated in FIG. 1. In FIG. 13, those parts with their counterparts already shown in FIGS. 1, 2 and 7 are given the same reference numerals, and detailed descriptions of such parts will be omitted hereunder where repetitive.

The second computer (NRCS PC) 120 is connected to the first computer (automation control PC) 110, robotics cameras 46, and audio mixer 47 via the automation network 150.

By way of the control unit 130, the first computer 110 is further connected with the OTC panel 131, video clip server 43, audio clip server 44, and VTR 45. The second computer 120 is connected to the play-out server 31. Output signals from the video clip server 43, audio clip server 44, VTR 45, play-out server 31, and robotics cameras 46 are fed to the switcher 41.

The first computer 110 controls the switcher 41 in operation through the control unit 130. The OTC panel 131 is also connected to the control unit 130.

Figure 14:
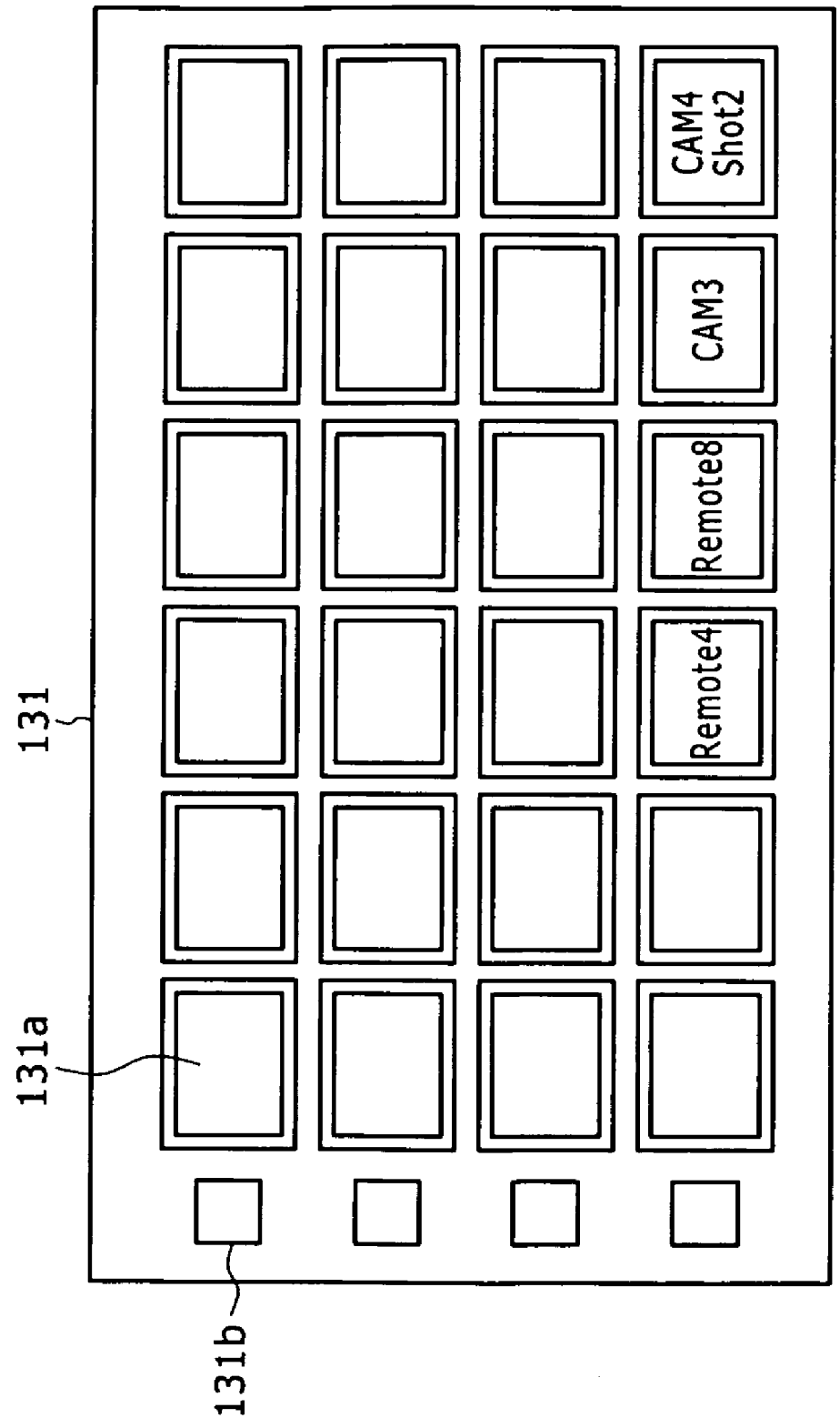
FIG. 14 is an external view of the OTC panel.

FIG. 14 is an external view of the OTC panel 131. The OTC panel 131 is furnished with 6 by 4 operation buttons 131a having a display function each. The display functions of the operation buttons 131a are implemented using an LCD panel installed in each of the buttons 131a. The display functions of the operation buttons 131a display the functions assigned to relevant operation buttons 131a. Also, the OTC panel 131 is furnished with page switching buttons 131b. The page switching buttons 131b may be operated to switch the functions of the 6 by 4 operation buttons 131a. On the OTC panel 131, the number of the operation buttons 131a and that of the page switching buttons 131b are given for illustration purposes and are not limited by the layout in FIG. 14.

The first control computer (automation control PC) 110 assigns functions to a plurality of operation buttons 131a on the OTC panel 131 in accordance with the control of the switcher 41 based on each configuration in the playlist (cue sheet). For that reason, the control unit 130 includes a storage section 130a for storing information denoting the function assignments to the multiple operation buttons 131a.

[Function Assignment Information in the Playlist]

As described above, functions are assigned to a plurality of operation buttons on the OTC panel 131 in accordance with the control of the switcher 41 based on each configuration in the playlist. For this reason, each configuration in the playlist contains the information denoting the function assignments to the multiple buttons on the OTC panel 131 (the information will be called the assignment data hereunder). Illustratively, the assignment data is arranged to be included in each configuration in a playlist when that playlist is created.

Figure 15:
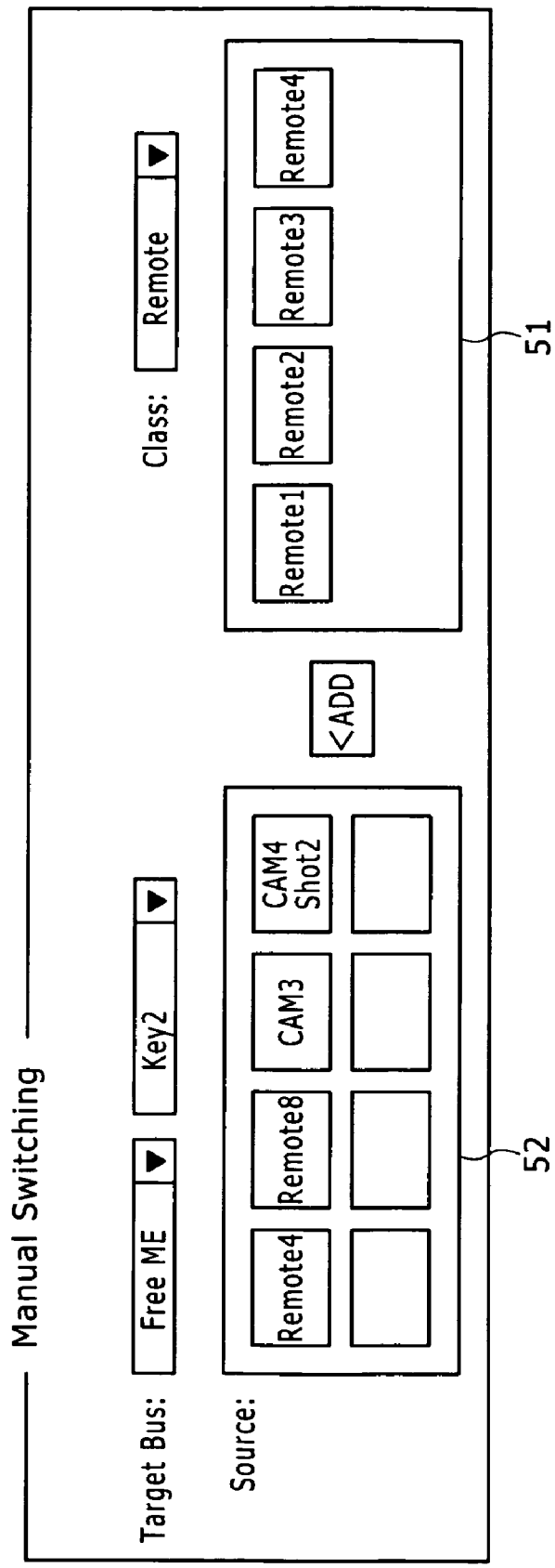
FIG. 15 is a schematic view showing a typical assignment data setting screen.

FIG. 15 shows a typical assignment data setting screen. Using this setting screen, the operator sets the assignment data which is assigned to a plurality of operation buttons 131a on the OTC panel 131 and which is to be included in each configuration in the playlist. As mentioned above, the playlist is created by the NRCS plug-in/playlist viewer section 102 (see FIG. 4), i.e., by the second computer (NRCS PC) 120. For this reason, the setting screen shown in FIG. 15 is displayed as a graphic user interface (GUI) on the monitor of the second computer 120.

Alternatively, the playlist may be created by the first computer 110 (automation control PC) 110. In this case, the setting screen shown in FIG. 15 is displayed as a GUI on the monitor of the first computer 110.

On the setting screen of FIG. 15, in the part where "Target Bus" is to be set, the target bus as the bus targeted for the selection of input video signals at the switcher 41 (see FIG. 9) is set. In this case, the operator sets the target bus by designating an ME bank and a bus.

In the example of FIG. 15, "Free ME" is designated as the ME bank and "Key2" as the bus. As mentioned above, the first picture processing section 420A and that part of the matrix switcher section 410 which corresponds thereto make up the first ME bank. And the second picture processing section 420B and that part of the matrix switcher section 410 which corresponds thereto constitute the second ME bank. In this setup, "Free ME" represents the first ME bank. Incidentally, the second ME bank is represented by "Main ME." The picture processing sections 420A and 420B are furnished with two key processing circuits each. "Key2" represents the key source signal selection input bus and key fill signal selection input bus connected to the key processing circuits 421A2 and 421B2. Parenthetically, "Key1" represents the key source signal selection input bus and key fill signal selection input bus connected to the key processing circuits 421A1 and 421B1. The ME bank is named "Main ME" because the bank in question is used in generating the final output picture at each particular point in time during automatic control. On the other hand, "Free ME" is used in making preparations for the next cue or the like at each particular point in time.

On the setting screen shown in FIG. 15, the part where "Class" is to be set is used in selecting one of groups of input video signals where the signals are thus grouped. The input video signals included in the group selected in the "Class" setting part are displayed in a box 51. In the example of FIG. 15, the group of "Remote (relay mobiles)" is selected, and the box 51 displays Remote1 through Remote4 as the input video signals contained in the selected group.

Also on the setting screen of FIG. 15, a box 52 is shown furnished in relation to "Source." The box 52 displays the input video signals as alternatives to choose from for the target bus set as described above. In the example of FIG. 15, Remote4, Remote8, CAM3, and CAM4 (Shot2) are indicated as the alternatives. The operator may select one of the input video signals in the box 51 by clicking on it and operate the "<ADD" button in that state. These operations copy the selected input video signal into the box 52.

Figure 16:
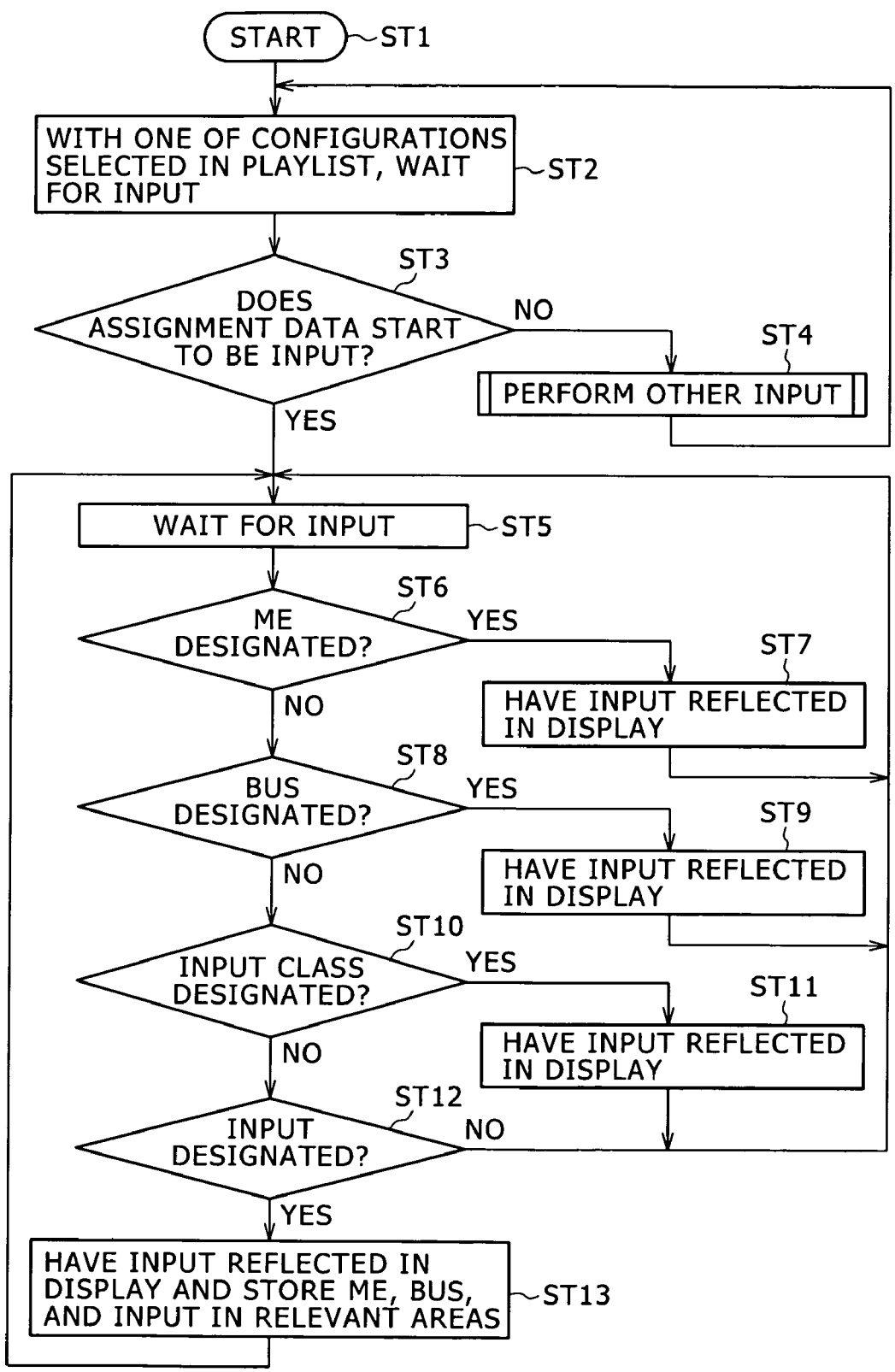
FIG. 16 is a flowchart showing a typical procedure performed by a second computer (NRCS PC) storing assignment data upon creation of a playlist (cue sheet)

The flowchart in FIG. 16 shows a typical procedure performed (as illustrated in FIG. 15) by the second computer 120 storing assignment data upon creation of a playlist (cue sheet).

The computer 120 starts the procedure in step ST1 and goes to step ST2. In step ST2, the computer 120 waits for input while one of the configurations in the playlist is being selected. Upon detecting input, the computer 120 determines in step ST3 whether the input denotes a start of assignment data input. If the input is not found to denote a start of assignment data input, the computer 120 goes to step ST4 and processes some other input. Thereafter, the computer 120 returns to step ST2 and waits for input.

If in step ST3 the input is found to denote a start of assignment data input, the computer 120 goes to step ST5 and waits for the assignment data to be input. The computer 120 proceeds to determine whether the ME is designated in step ST6, whether the bus is designated in step ST8, whether the input class is designated in step ST10, and whether the input (i.e., input video signal) is designated in step ST12.

When the designation is found to be made in each of steps ST6, ST8 and ST10, the computer 120 causes the input (i.e., designation) to be reflected in steps ST7, ST9, and ST11, respectively. Thereafter, the computer 120 returns to step ST5. If in step ST12 no input video signal is found designated, the computer 120 returns to step ST5. If in step ST12 the input video signal is found designated, the computer 120 goes to step ST13 and causes the input to be reflected in the display and stores the displayed ME, bus, and input into relevant storage areas as the assignment data. From step ST13, the computer 120 returns to step ST5.

The assignment data included in each configuration in the playlist includes the target bus for the switcher 41, the display content corresponding to operation buttons or to a display section corresponding to these buttons, and the information denoting the input number of the selected input video signal. The target bus for the switcher 41 is determined by what is designated as the ME and as the bus, as described above. Also, the display content and the input number are determined by the above-mentioned input designation.

FIG. 17 shows a typical playlist content. This is an example showing extracts of the description about the ME and other items in a playlist. Each configuration in the playlist includes the assignment data corresponding to a plurality of buttons on the OTC panel 131. Illustratively, the configuration of relay 1 listed at No. 1 includes assignment data 1, and the configuration of studio 1 listed at No. 2 includes assignment data 2.

Regarding the target bus indicated by the assignment data, the input video signal to be selected first is predetermined by the items other than the assignment data in the ME configuration. For example, if the target bus indicated by the assignment data 1 for the configuration of relay 1 listed at No. 1 is "Bkgd A," then the input video signal to be selected first for the bus "Bkgd A" is "Picture from studio camera 1." Where alternatives of the input video signal are included in the assignment data 1, it becomes possible for the operator to manipulate the operation buttons 131a on the OTC panel 131 to switch the input video signal selected for the target bus "Bkgd A" to another input video signal. When "Picture from studio camera 1" is included in the alternatives, the operator may restore the initial state following the switch.

[Operation Upon Execution of the Playlist]

Figure 18:
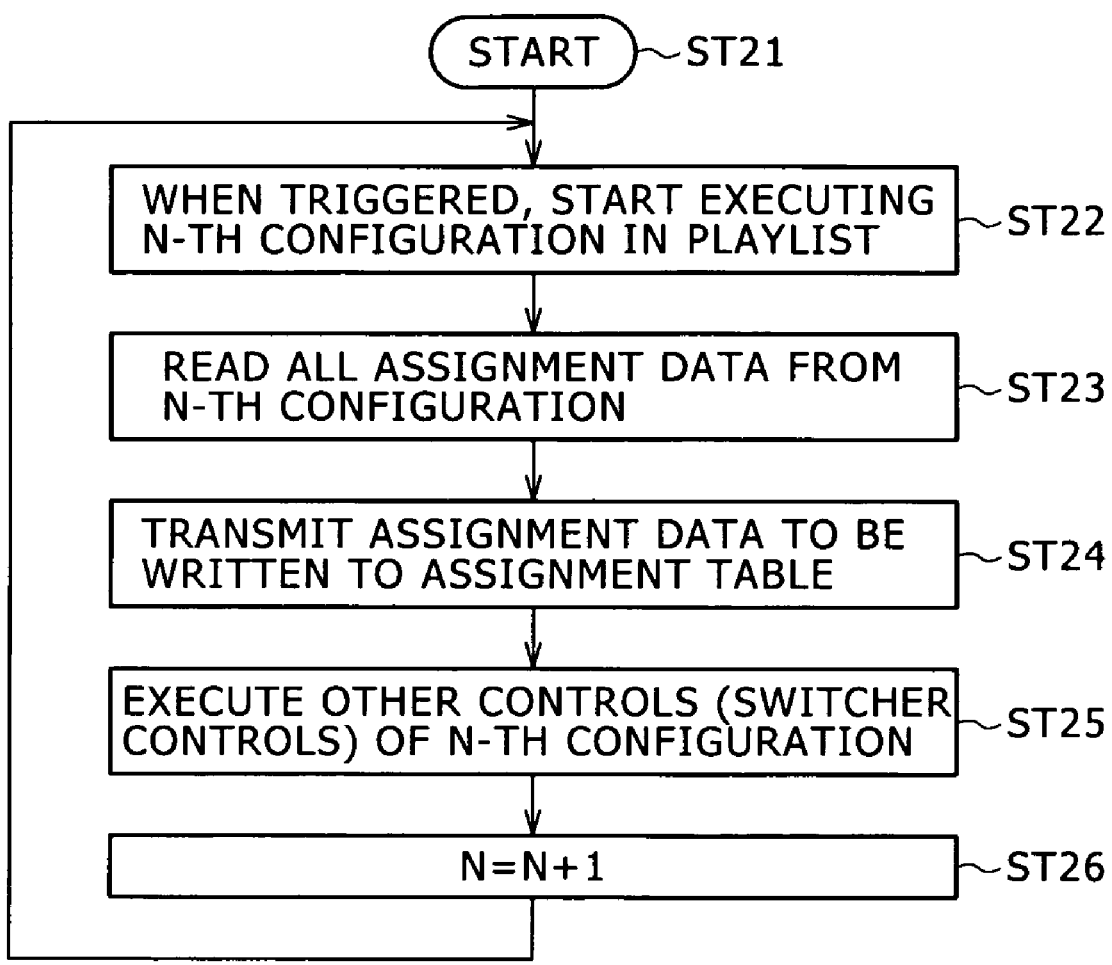
FIG. 18 is a flowchart showing a control procedure performed by a first computer (automation control PC) upon execution of a playlist.

Explained hereunder is the operation performed upon execution of a playlist having assignment data contained in each of its configurations as shown in FIG. 17. The flowchart of FIG. 18 shows a control procedure performed by the first computer (automation control PC) 110 upon playlist execution.

The computer 110 starts the control procedure in step ST21 and goes to step ST22. In step ST22, the computer 110 is triggered to start executing the N-th configuration in the playlist. The number N is initially "1."

Then in step ST23, the computer 110 reads all assignment data from the N-th configuration in the playlist. In step ST24, the computer 110 transmits the assignment data to the control unit 130 in such a manner as to get the data written to a button assignment table in the control unit 130. With the assignment data written to the button assignment table in the control unit 130, functions are assigned to a plurality of operation buttons on the OTC panel 131. Alternatively, the button assignment table may be established not in the storage section 130a of the control unit 130 but in another storage section, not shown, inside the computer 110.

In step ST25, the computer 110 executes other controls (e.g., switcher control) of the N-th configuration. From step ST25, the computer 110 goes to step ST26 and increments the number N by "1." Thereafter, the computer 110 returns to step ST22 and starts executing the next configuration in the playlist.

FIG. 19 shows typical assignment data. In the example of FIG. 19, the operation button 131a having button No. 1 on the OTC panel 131 is shown to be assigned the function of designating selection of the input video signal having input No. 5 as the input video signal for the bus A of the first ME bank (Free ME). A display "Remote4" is given in relation to the operation button having button No. 1. In this case, if each operation button on the OTC panel 131 has the display capability, then the characters "Remote4" are displayed on the applicable operation button. Alternatively, if none of the operation buttons on the OTC panel 131 has the display capability, then the display section corresponding to the applicable operation button will display the characters "Remote4."

In the case of the assignment data in FIG. 19, of the multiple operation buttons on the OTC panel 131, four buttons display "Remote4," "Remote8," "CAM3," and "CAM4 Shot2"as shown in FIG. 14. The button display indicates that the four operation buttons are assigned the functions of designating selection of the input video signals "Remote4," "Remote8," "CAM3," and "CAM4 Shot2" respectively.

FIG. 20 shows another typical assignment data. In the example of FIG. 20, the operation button 131a having button No. 1 on the OTC panel 131 is shown to be assigned the function of designating selection of the input video signal having input No. 5 as the input video signal for the bus A of the first ME bank (Free ME). A display "Remote4" is given in relation to the operation button having button No. 1.

Also, the operation button 131a having button No. 3 on the OTC panel 131 is shown to be assigned the function of designating selection of the input video signal having input No. 5 as the input video signal for the bus B of the second ME bank (Main ME). A display "Remote4" is given in relation to the operation button having button No. 3.

FIGS. 19 and 20 show the examples of assignment data indicating that the information about the target bus (ME, bus) for the switcher 41 is included for each operation button. With regard to a given configuration in the playlist, it is thus possible to designate selection of the input video signal not just for one bus but for each of a plurality of buses. The typical assignment data in FIG. 20 shows in fact that the input video signals for a plurality of buses are designated to be selected.

FIG. 21 shows still another typical assignment data. In this example, the information about the target bus (ME, bus) for the switcher 41 is common to all operation buttons. In this case, the selection of the input video signal for only one bus can be designated.

Figure 22:
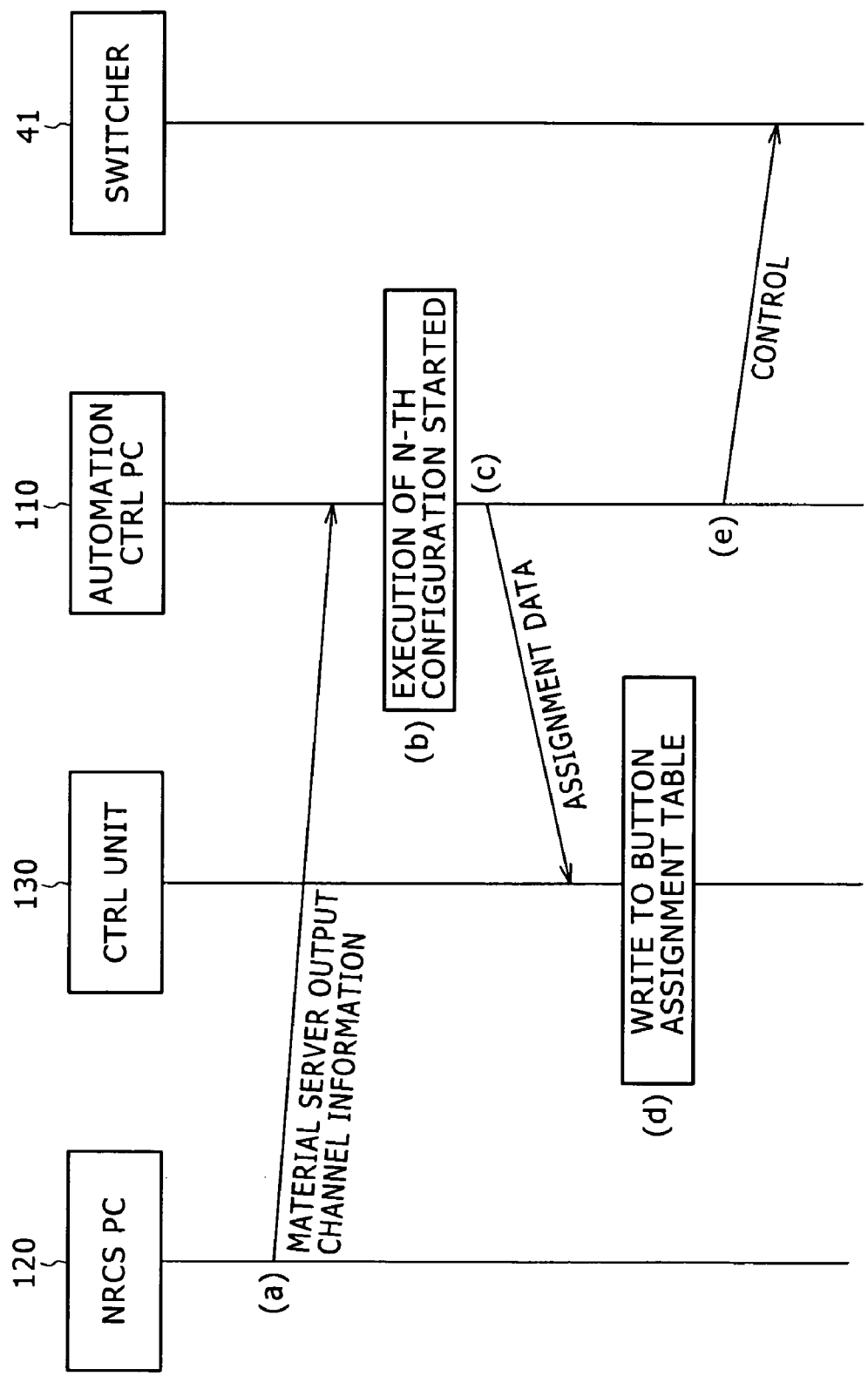
FIG. 22 is a communication sequence diagram in effect upon execution of a playlist (cue sheet)

FIG. 22 is a communication sequence diagram in effect upon execution of a playlist (cue sheet). The second computer (NRCS PC) 120 transmits (in step (a) of FIG. 22) information about the output channels of the material server such as the play-out server 31 to the first computer (automation control PC) 110. In turn, the first computer 110 starts executing the N-th configuration (in step (b)). The first computer 110 reads the assignment data from the N-th configuration and sends the retrieved data to the control unit 130 (in step (c)). On receiving the assignment data from the first computer 110, the control unit 130 writes the data to the assignment table (in step (d)). Also, the first computer 110 controls the switcher 41 based on the N-th configuration (in step (e)).

[Operation Upon Button Operation on the OTC Panel]

Figure 23:
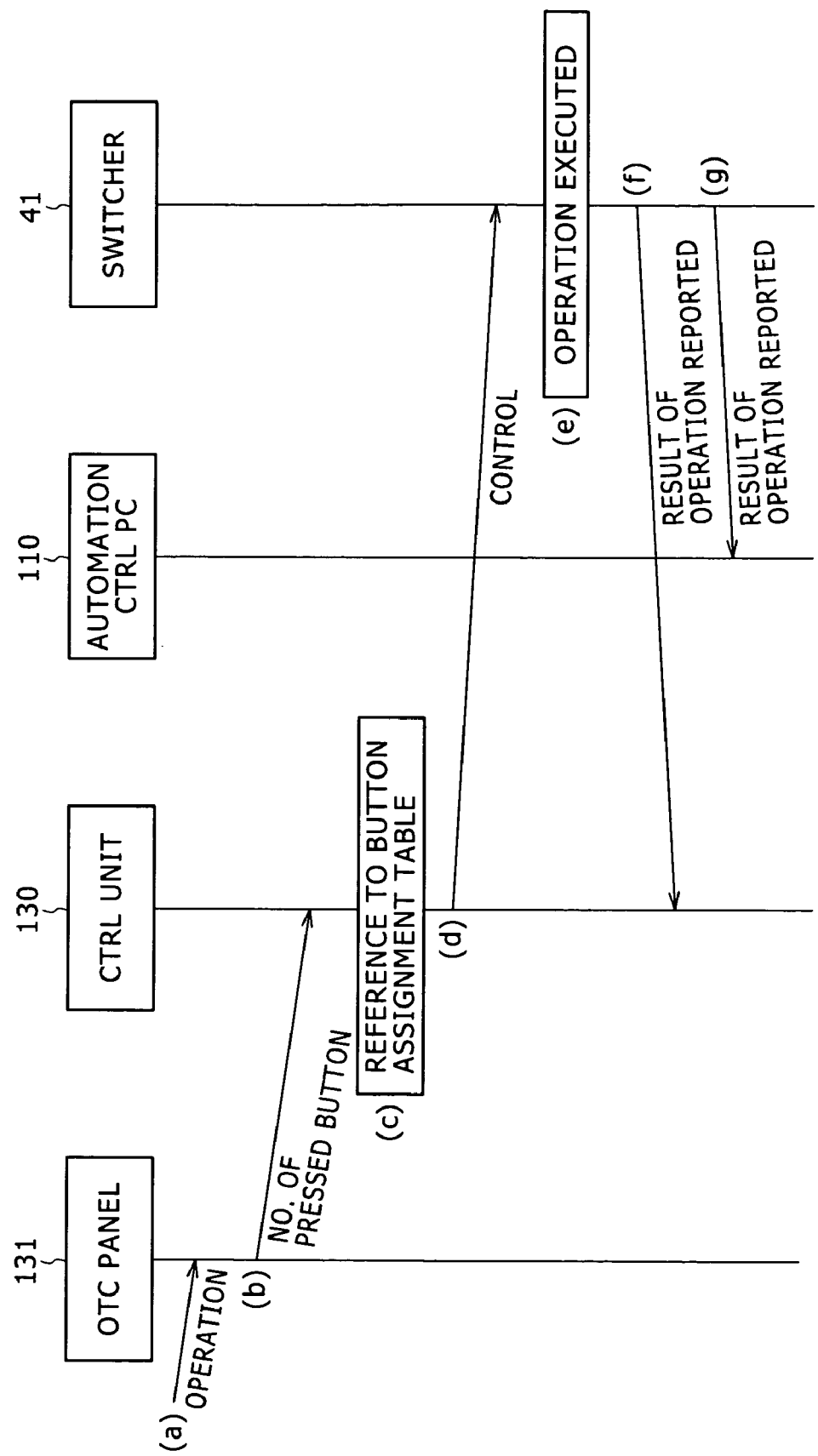
FIG. 23 is a communication sequence diagram in effect upon button operation on the OTC panel.

Explained hereunder is what takes place when a particular operation button 131a on the OTC panel 131 is operated, the button 131a being assigned the function of designating selection of the input video signal in accordance with the control of the switcher 41 based on each configuration in the playlist. FIG. 23 is a communication sequence diagram in effect upon button operation on the OTC panel.

In step (a) of FIG. 23, the operator presses a particular operation button to which a function has been assigned from among the multiple operation buttons on the OTC panel 131. The pressing action causes the OTC panel 131 to transmit information denoting the number of the pressed operation button to the control unit 130 in step (b). In step (c), the control unit 130 references the button assignment table. In step (d), the control unit 130 instructs the switcher 41 to select the input video signal set for the target bus in accordance with the assignment data applicable to the button in question. Given the instructions in step (e), the switcher 41 executes accordingly the operation of selecting the input video signal for the target bus. Thereafter, the switcher 41 notifies the control unit 130 and first computer 110 of the result of the operation in steps (f) and (g).

As described above, in the program delivery control system 100 shown in FIGS. 1 and 13, the first computer 110 writes assignment data to the button assignment table in accordance with the control of the switcher 41 based on each configuration in the playlist, the assignment data being included in the configuration of interest. Thus functions can be assigned appropriately to a plurality of operation buttons 131a on the OTC panel 131 in keeping with each configuration in the playlist.

Also in the program delivery control system 100 shown in FIGS. 1 and 13, each function assigned to a particular operation button on the OTC panel 131 in accordance with assignment data is a function that designates selection of the input video signal on the target bus for the switcher 41. Thus the operator manipulating operation buttons 131a on the OTC panel 131 can easily switch the sources such as a picture in picture-in-picture form or a background picture for chromakey while a program is being put on the air.

Also in the program delivery control system 100 shown in FIGS. 1 and 13, the assignment data is arranged to include the display content to be displayed on operation buttons or on the display section corresponding to these operation buttons. The functions assigned to the operation buttons are thus displayed on these operation buttons (having display capabilities) 131a on the OTC panel 131 or on the display section corresponding to these operation buttons 131a, the ease of operation for the operator is enhanced appreciably.

<2. Variations>

[Material Information as the Input Number Information within Assignment Data]

If a material server such as the play-out server 31 has a plurality of output channels, then video material to be acquired from that server may not be determined by the video signal input number of the switcher 41. For this reason, assignment data may be arranged to include information about the video materials available from the material server as information denoting the input numbers of the input video signals to be selected. FIG. 24 shows typical assignment data including information about the video materials of a material server as information about the input numbers of input video signals to be selected.

In accordance with the control of the switcher 41 based on each configuration in the playlist, the first computer 110 reads the assignment data included in the configuration in question and writes the retrieved data to the button assignment table in the storage section 130a of the control unit 130 as discussed above.

In that case, if information about the video materials of the material server is included as information about the input numbers of the input video signals to be selected, then the video material information is replaced by those video signal input numbers of the switcher 41 which correspond to the output channels through which the video materials of the material server are to be output.

Before executing the playlist, the first computer (automation control PC) 110 sends an output material list of each configuration (cue) in the playlist to the material server such as the play-out server 31 by way of the second computer (NRCS PC) 120. After determining output channel assignments, the material server transmits output channel information to the first computer 110 via the second computer (NRCS PC) 120, the output channel information specifying which materials included in the output material list are to be output through which channels.

The first computer 110 replaces the video material information with the video signal input numbers of the switcher 41 based on the output channel information from the second computer 120 and in keeping with a table of correspondence between material server output channels and switcher input numbers, as shown in Table 8 below. In FIG. 22, this process is carried out in step (b).

TABLE 8

Material server output channels vs. switcher input numbers

| Material server output channel | Switcher input number |
|---|---|
| A | 5 |
| B | 6 |
| C | 10 |
| D | 11 |
| E | 12 |

Figure 25:
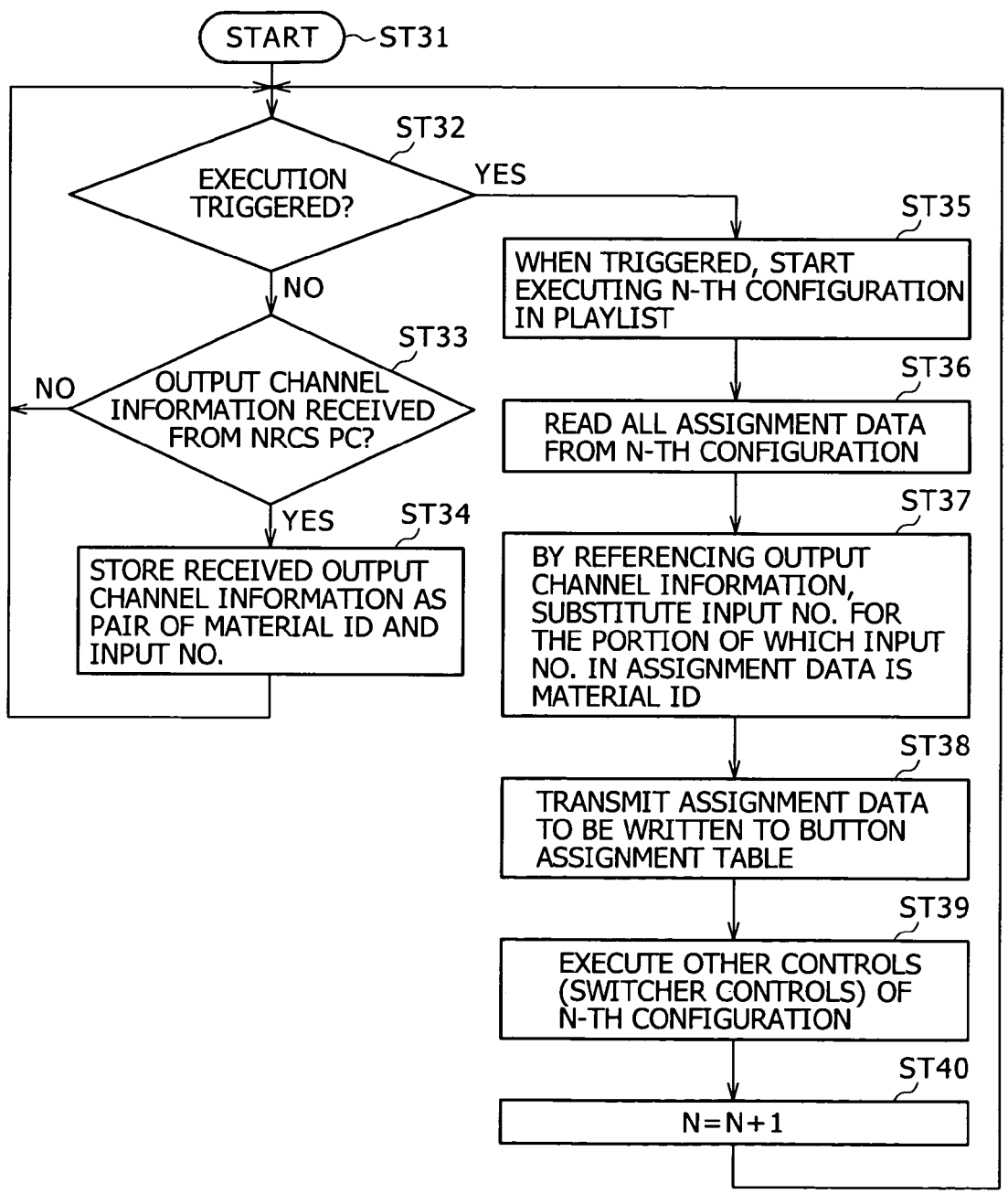
FIG. 25 is a flowchart showing another control procedure performed by the first computer (automation control PC) upon execution of a playlist.

FIG. 25 shows another control procedure performed by the first computer (automation control PC) 110 upon execution of a playlist.

The computer 110 starts the control procedure in step ST31 and goes to step ST32. In step ST32, the computer 110 determines whether execution of the procedure is triggered. If in step ST32 the execution is not found to be triggered, the computer 110 goes to step ST33 and determines whether output channel information denoting the video materials in the material server is received from the second computer (NRCS PC) 120. If in step ST33 the output channel information is not found to be received, the computer 110 returns immediately to step ST32.

If in step ST33 the output channel information is found to be received, the computer 110 goes to step ST34 and stores the received output channel information as pairs of materials IDs (i.e., material information) and switcher input numbers for each configuration (i.e., at broadcast times of each configuration). After step ST34, the computer 110 returns to step ST32.

If in step ST32 the execution is found to be triggered, the computer 110 goes to step ST35 and starts executing the N-th configuration in the playlist given a trigger. The number N is initially "1." In step ST36, the computer 110 reads all assignment data from the N-th configuration in the playlist.

In step ST37, the computer 110 substitutes input numbers for the portions of which the input numbers are material IDs (material information) in the assignment data, by referencing the output channel information stored in step ST34 regarding the N-th configuration. In step ST38, the computer 110 transmits the assignment data to the control unit 130 so as to get the data written to the button assignment table established in the storage section 130a inside the control unit 130.

In step ST39, the computer 110 executes other controls (switcher controls) of the N-th configuration. In step ST40, the computer 110 increments the number N by "1." After step ST40, the computer 110 returns to step ST32 and waits illustratively for execution of the next configuration in the playlist.

As described above, the information denoting the video materials in the material server is replaced by video signal input numbers for the switcher 41 before the input numbers are written to the button assignment table. Thus when the target materials to be selected manually include video materials in the material server, the above arrangement allows the operator manipulating operation buttons on the OTC panel 131 to designate unfailingly the bus input video signals (i.e., video materials from the material server) for the switcher 41.

[Other Connection Examples of the Control Unit]

In the program delivery control system 100 of FIG. 13, the control unit 130 is shown connected to the first computer 110 so that the switcher 41 and OTC panel 131 are controlled by the control unit 130. However, this setup is merely an example and not limitative of the present invention.

Figure 26:
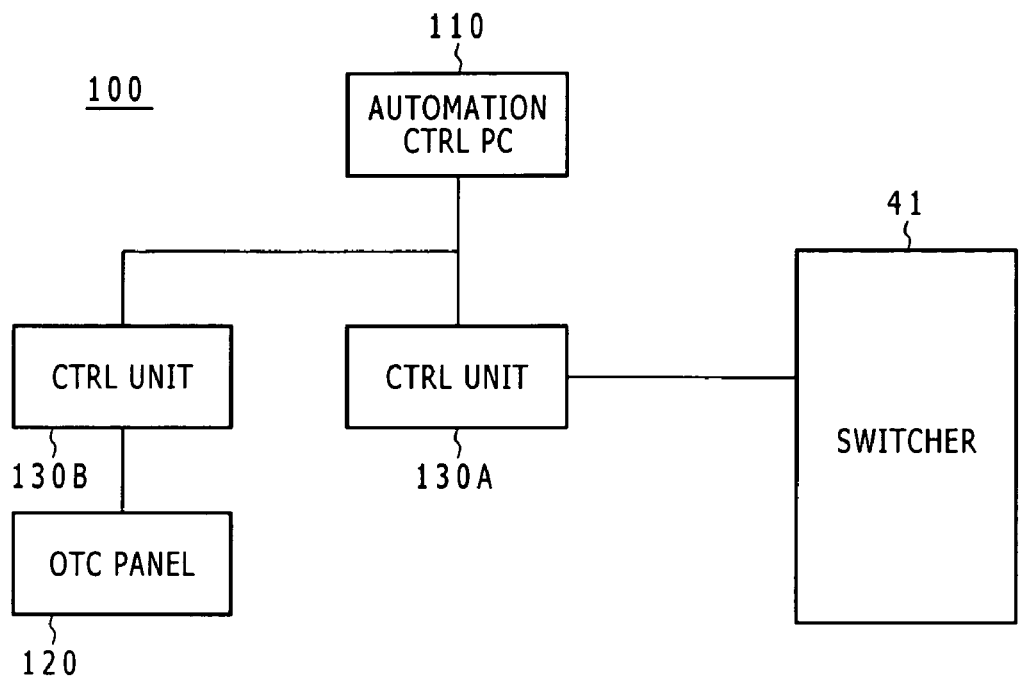
FIG. 26 is a schematic view showing another typical connection setup of a control unit arrangement.

FIG. 26 shows another typical connection setup of a control unit arrangement. In this case, a control unit 130A for controlling the switcher 41 and a control unit 130B for controlling the OTC panel 131 are independently set up. These control units 130A and 130B are connected to the first computer 110.

Figure 27:
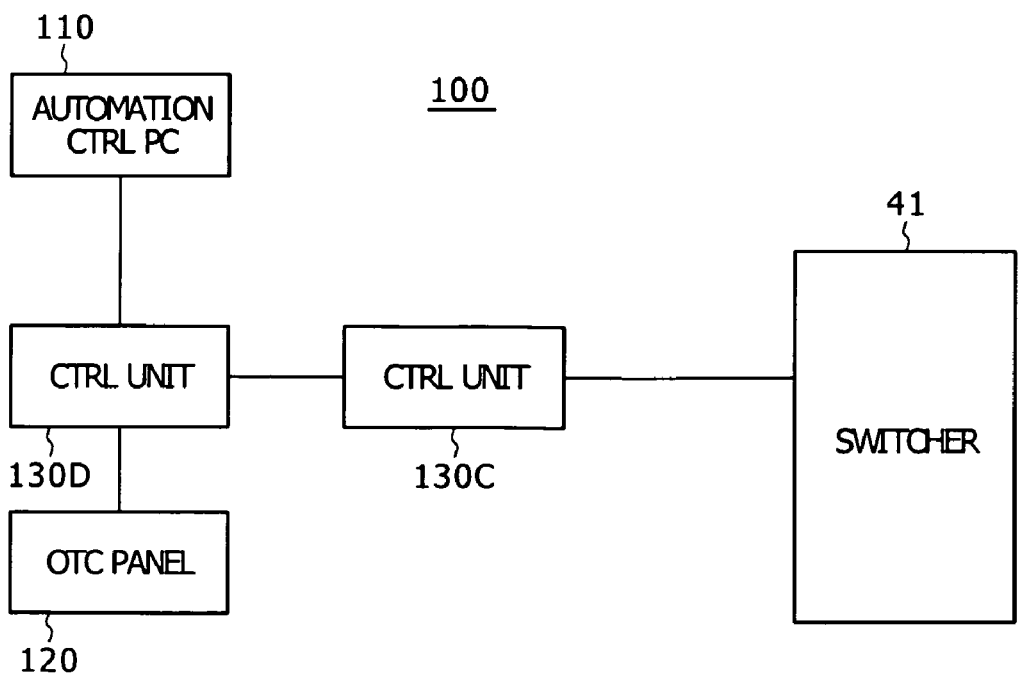
FIG. 27 is a schematic view showing still another typical connection setup of the control unit arrangement.

FIG. 27 shows still another typical connection setup of the control unit arrangement. In this case, too, a control unit 130C for controlling the switcher 41 and a control unit 130D for controlling the OTC panel 131 are independently set up. It should be noted here that the control unit 130D is connected directly to the first computer 110 whereas the control unit 130C is connected to the first computer 110 by way of the control unit 130D. In these setups, the configured devices may be arranged to communicate with one another suitably in a manner implementing the present invention.

[Others]

In the above-described embodiment of the present invention, the functions assigned to operation buttons 131a on the OTC panel 131 in accordance with assignment data are the functions that designate the selection of input video signals for the switcher 41. However, this is not limitative of the present invention. Alternatively, the functions such as those of designating the turning on/off Keyer (superimposing) and of specifying the adjusting values for picture-in-picture positions may be assigned to operation buttons 131a on the OTC panel 131.

The embodiments of the present invention, as explained above, permits suitable assignment of functions to a plurality of operation buttons in relation to diverse items in a program delivery program. The invention can thus be applied to program delivery control systems and other arrangements.

It should be understood by those skilled in the art that various modifications, combinations, sub-combinations and alterations may occur depending on design requirements and other factor in so far as they are within the scope of the appended claims or the equivalents thereof.

What is claimed is:

1. A program delivery apparatus comprising:
   a program delivery control section configured to control program delivery based on a program delivery program made up of a plurality of items;
   a switcher configured to switch video signals when connected to said program delivery control section via communication channels;
   a plurality of operation buttons; and
   a storage section configured to store function assignment information about assigning functions to said plurality of operation buttons; wherein
   each of said items of said program delivery program includes said function assignment information regarding said plurality of operation buttons, and
   in accordance with control of said switcher based on each of said items making up said program delivery program, said program delivery control section writes said function assignment information included in each of said items to said storage section, whereby said plurality of operation buttons are assigned the functions,
   wherein for each item the operation buttons are assigned to respective input lines on a one-to-one basis and each input line is associated with a character string indicative of a source, such that for each item each operation button is associated with a character string, and such that for at least one operation button the character string associated with the button automatically changes with a change in item.

2. The program delivery apparatus according to claim 1, wherein said functions assigned based on said function assignment information to said plurality of operation buttons are functions which designate said switcher to select a bus input video signal.

3. The program delivery apparatus according to claim 2, wherein said function assignment information includes a target bus for said switcher, a display content to be displayed either on said operation buttons or on a display section corresponding to said operation buttons, and input number information about the selected input video signal.

4. The program delivery apparatus according to claim 2, wherein said function assignment information includes information about the target bus for said switcher with regard to each of said operation buttons.

5. The program delivery apparatus according to claim 1, further comprising:
   an operation button control section configured to control said operation buttons; wherein
   said operation button control section has said storage section, and
   said operation button control section is connected to said program delivery control section and said switcher via communication channels.

6. The program delivery apparatus according to claim 2, further comprising a material server configured to have a plurality of output channels for outputting video materials and be connected to said program delivery control section via communication channels; wherein
   said function assignment information includes either a video signal input number for said switcher or video material information for said material server as input number information about the selected input video signal, and
   when said function assignment information is to be written to said storage section in accordance with control of said switcher based on each of said items making up said program delivery program, if the input number information about said input video signal is the video material information for said material server, then said program delivery control section substitutes said video material information for the video signal input number of said switcher in relation to the output channels through which said video materials of said material server are output based on output channel information about said video materials of said material server.

7. The program delivery apparatus according to claim 6, further comprising
   a newsroom control system configured to perform management regarding news programs when connected to said program delivery control section via communication channels;
   wherein said newsroom control system controls said material server to transmit the output channel information about said video materials output by said material server to said program delivery control section.

8. An operation button function assigning method for use with a program delivery apparatus including
   a program delivery control section configured to control program delivery based on a program delivery program made up of a plurality of items;
   a switcher configured to switch video signals when connected to said program delivery control section via communication channels;
   a plurality of operation buttons; and
   a storage section configured to store function assignment information about assigning functions to said plurality of operation buttons, said operation button function assigning method comprising the steps of:
   causing each of said items of said program delivery program to have said function assignment information regarding said plurality of operation buttons; and
   in accordance with control of said switcher based on each of said items making up said program delivery program, causing to write said function assignment information included in each of said items to said storage section,
   wherein for each item the operation buttons are assigned to respective input lines on a one-to-one basis and each input line is associated with a character string indicative of a source, such that for each item each operation button is associated with a character string, and such that for at least one operation button the character string associated with the button automatically changes with a change in item.

* * * * *